US012783549B2

(12) United States Patent
Philpot et al.

(10) Patent No.: US 12,783,549 B2
(45) Date of Patent: Nov. 3, 2026

(54) METHODS OF SYNCHRONIZING HIERARCHICAL DATABASES AND RELATED COMPUTING SYSTEMS

(71) Applicant: CDK GLOBAL, LLC, Austin, TX (US)

(72) Inventors: Tom Philpot, Austin, TX (US); Vijaya Babu Srireddy, Austin, TX (US); Gennadiy Polyachenko, Artesia, CA (US)

(73) Assignee: CDK Global, LLC, Austin, TX (US)

( * ) Notice: Subject to any disclaimer, the term of this patent is extended or adjusted under 35 U.S.C. 154(b) by 0 days.

(21) Appl. No.: 18/981,246

(22) Filed: Dec. 13, 2024

(65) Prior Publication Data

US 2026/0170012 A1 Jun. 18, 2026

(51) Int. Cl.

*G06F 16/28* (2019.01)
*G06F 16/23* (2019.01)
*G06F 16/27* (2019.01)

(52) U.S. Cl.

CPC ........ *G06F 16/282* (2019.01); *G06F 16/2358* (2019.01); *G06F 16/27* (2019.01)

(58) Field of Classification Search

CPC ..... G06F 16/282; G06F 16/27; G06F 16/2358

See application file for complete search history.

(56) References Cited

U.S. PATENT DOCUMENTS

| | | | |
|---|---|---|---|
| 3,792,445 | A | 2/1974 | Bucks et al. |
| 4,258,421 | A | 3/1981 | Juhasz et al. |
| 4,992,940 | A | 2/1991 | Dworkin |

(Continued)

FOREIGN PATENT DOCUMENTS

| | | |
|---|---|---|
| CA | 2494350 | 5/2004 |
| EP | 0461888 | 3/1995 |
| WO | 2007002759 | 1/2007 |

OTHER PUBLICATIONS http://web.archive.org/web/20010718130244/http://chromedata.com/maing2/about/index.asp, 1 pg., 2001.

(Continued)

*Primary Examiner* — Khanh B Pham
(74) *Attorney, Agent, or Firm* — Stoel Rives LLP

(57) ABSTRACT

Methods of synchronizing destination hierarchical databases to source hierarchical databases and related computing systems are disclosed. A method includes detecting a change to source hierarchical data stored by the source hierarchical databases, which are organized into two or more hierarchical levels including a highest level and one or more sub-levels. The method also includes generating messages, each including an object corresponding to a segment of the changed source hierarchical data. The object includes an entity identification and a change data operation. The object further includes a parent identification if the changed source hierarchical data of the object is from the one or more sub-levels. The method also includes changing the destination hierarchical data responsive to the messages. A computing system includes a processor and data storage devices including source hierarchical databases, destination hierarchical databases, and computer-readable instructions configured to instruct the processor to perform operations of the method.

20 Claims, 9 Drawing Sheets

(56) References Cited

U.S. PATENT DOCUMENTS

| | | | |
|---|---|---|---|
| 5,003,476 | A | 3/1991 | Abe |
| 5,034,889 | A | 7/1991 | Abe |
| 5,058,044 | A | 10/1991 | Stewart et al. |
| 5,421,015 | A | 5/1995 | Khoyi et al. |
| 5,442,553 | A | 8/1995 | Parrillo |
| 5,452,446 | A | 9/1995 | Johnson |
| 5,521,815 | A | 5/1996 | Rose, Jr. |
| 5,649,186 | A | 7/1997 | Ferguson |
| 5,694,595 | A | 12/1997 | Jacobs et al. |
| 5,729,452 | A | 3/1998 | Smith et al. |
| 5,764,943 | A | 6/1998 | Wechsler |
| 5,787,177 | A | 7/1998 | Leppek |
| 5,790,785 | A | 8/1998 | Klug et al. |
| 5,835,712 | A | 11/1998 | DuFresne |
| 5,845,299 | A | 12/1998 | Arora et al. |
| 5,862,346 | A | 1/1999 | Kley et al. |
| 5,911,145 | A | 6/1999 | Arora et al. |
| 5,956,720 | A | 9/1999 | Fernandez et al. |
| 5,974,149 | A | 10/1999 | Leppek |
| 5,974,418 | A | 10/1999 | Blinn et al. |
| 5,974,428 | A | 10/1999 | Gerard et al. |
| 5,978,776 | A | 11/1999 | Seretti et al. |
| 5,987,506 | A | 11/1999 | Carter et al. |
| 6,003,635 | A | 12/1999 | Bantz et al. |
| 6,006,201 | A | 12/1999 | Berent et al. |
| 6,009,410 | A | 12/1999 | LeMole et al. |
| 6,018,748 | A | 1/2000 | Smith |
| 6,021,416 | A | 2/2000 | Dauerer et al. |
| 6,021,426 | A | 2/2000 | Douglis et al. |
| 6,026,433 | A | 2/2000 | D'Arlach et al. |
| 6,041,310 | A | 3/2000 | Green et al. |
| 6,041,344 | A | 3/2000 | Bodamer et al. |
| 6,055,541 | A | 4/2000 | Solecki et al. |
| 6,061,698 | A | 5/2000 | Chadha et al. |
| 6,067,559 | A | 5/2000 | Allard et al. |
| 6,070,164 | A | 5/2000 | Vagnozzi |
| 6,134,532 | A | 10/2000 | Lazarus et al. |
| 6,151,609 | A | 11/2000 | Truong |
| 6,178,432 | B1 | 1/2001 | Cook et al. |
| 6,181,994 | B1 | 1/2001 | Colson et al. |
| 6,185,614 | B1 | 2/2001 | Cuomo et al. |
| 6,189,104 | B1 | 2/2001 | Leppek |
| 6,216,129 | B1 | 4/2001 | Eldering |
| 6,219,667 | B1 | 4/2001 | Lu et al. |
| 6,236,994 | B1 | 5/2001 | Schwartz et al. |
| 6,240,365 | B1 | 5/2001 | Bunn |
| 6,263,268 | B1 | 7/2001 | Nathanson |
| 6,285,932 | B1 | 9/2001 | de Belledeuille et al. |
| 6,289,382 | B1 | 9/2001 | Bowman-Amuah |
| 6,295,061 | B1 | 9/2001 | Park et al. |
| 6,330,499 | B1 | 12/2001 | Chou et al. |
| 6,343,302 | B1 | 1/2002 | Graham |
| 6,353,824 | B1 | 3/2002 | Boguraev et al. |
| 6,356,822 | B1 | 3/2002 | Diaz et al. |
| 6,374,241 | B1 | 4/2002 | Lamburt et al. |
| 6,397,226 | B1 | 5/2002 | Sage |
| 6,397,336 | B2 | 5/2002 | Leppek |
| 6,401,103 | B1 | 6/2002 | Ho et al. |
| 6,421,733 | B1 | 7/2002 | Tso et al. |
| 6,473,849 | B1 | 10/2002 | Keller et al. |
| 6,496,855 | B1 | 12/2002 | Hunt et al. |
| 6,505,106 | B1 | 1/2003 | Lawrence et al. |
| 6,505,205 | B1 | 1/2003 | Kothuri et al. |
| 6,519,617 | B1 | 2/2003 | Wanderski et al. |
| 6,529,948 | B1 | 3/2003 | Bowman-Amuah |
| 6,535,879 | B1 | 3/2003 | Behera |
| 6,539,370 | B1 | 3/2003 | Chang et al. |
| 6,546,216 | B2 | 4/2003 | Mizoguchi et al. |
| 6,553,373 | B2 | 4/2003 | Boguraev et al. |
| 6,556,904 | B1 | 4/2003 | Larson et al. |
| 6,564,216 | B2 | 5/2003 | Waters |
| 6,571,253 | B1 | 5/2003 | Thompson et al. |
| 6,581,061 | B2 | 6/2003 | Graham |
| 6,583,794 | B1 | 6/2003 | Wattenberg |
| 6,594,664 | B1 | 7/2003 | Estrada et al. |
| 6,606,525 | B1 | 8/2003 | Muthuswamy et al. |
| 6,629,148 | B1 | 9/2003 | Ahmed et al. |
| 6,640,244 | B1 | 10/2003 | Bowman-Amuah et al. |
| 6,643,663 | B1 | 11/2003 | Dabney et al. |
| 6,654,726 | B1 | 11/2003 | Hanzek |
| 6,674,805 | B1 | 1/2004 | Kovacevic et al. |
| 6,678,706 | B1 | 1/2004 | Fishel |
| 6,697,825 | B1 | 2/2004 | Underwood et al. |
| 6,701,232 | B2 | 3/2004 | Yamaki |
| 6,721,747 | B2 | 4/2004 | Lipkin |
| 6,728,685 | B1 | 4/2004 | Ahluwalia |
| 6,738,750 | B2 | 5/2004 | Stone et al. |
| 6,744,735 | B1 | 6/2004 | Nakaguro |
| 6,748,305 | B1 | 6/2004 | Klausner et al. |
| 6,785,864 | B1 | 8/2004 | Te et al. |
| 6,795,819 | B2 | 9/2004 | Wheeler et al. |
| 6,823,258 | B2 | 11/2004 | Ukai et al. |
| 6,823,359 | B1 | 11/2004 | Heidingsfeld |
| 6,826,594 | B1 | 11/2004 | Pettersen |
| 6,847,988 | B2 | 1/2005 | Toyouchi et al. |
| 6,850,823 | B2 | 2/2005 | Eun et al. |
| 6,871,216 | B2 | 3/2005 | Miller et al. |
| 6,894,601 | B1 | 5/2005 | Grunden et al. |
| 6,901,430 | B1 | 5/2005 | Smith |
| 6,917,941 | B2 | 7/2005 | Wight et al. |
| 6,922,674 | B1 | 7/2005 | Nelson |
| 6,941,203 | B2 | 9/2005 | Chen |
| 6,944,677 | B1 | 9/2005 | Zhao |
| 6,954,731 | B1 | 10/2005 | Montague et al. |
| 6,963,854 | B1 | 11/2005 | Boyd et al. |
| 6,965,806 | B2 | 11/2005 | Eryurek et al. |
| 6,965,968 | B1 | 11/2005 | Touboul |
| 6,978,273 | B1 | 12/2005 | Bonneau et al. |
| 6,981,028 | B1 | 12/2005 | Rawat et al. |
| 6,990,629 | B1 | 1/2006 | Heaney et al. |
| 6,993,421 | B2 | 1/2006 | Pillar |
| 7,000,184 | B2 | 2/2006 | Matveyenko et al. |
| 7,003,476 | B1 | 2/2006 | Samra et al. |
| 7,010,495 | B1 | 3/2006 | Samra et al. |
| 7,028,072 | B1 | 4/2006 | Kliger et al. |
| 7,031,554 | B2 | 4/2006 | Iwane |
| 7,039,704 | B2 | 5/2006 | Davis et al. |
| 7,047,318 | B1 | 5/2006 | Svedloff |
| 7,062,343 | B2 | 6/2006 | Ogushi et al. |
| 7,062,506 | B2 | 6/2006 | Taylor et al. |
| 7,072,943 | B2 | 7/2006 | Landesmann |
| 7,092,803 | B2 | 8/2006 | Kapolka et al. |
| 7,107,268 | B1 | 9/2006 | Zawadzki et al. |
| 7,124,116 | B2 | 10/2006 | Huyler |
| 7,152,207 | B1 | 12/2006 | Underwood et al. |
| 7,155,491 | B1 | 12/2006 | Schultz et al. |
| 7,171,418 | B2 | 1/2007 | Blessin |
| 7,184,866 | B2 | 2/2007 | Squires et al. |
| 7,197,764 | B2 | 3/2007 | Cichowlas |
| 7,219,234 | B1 | 5/2007 | Ashland et al. |
| 7,240,125 | B2 | 7/2007 | Fleming |
| 7,246,263 | B2 | 7/2007 | Skingle |
| 7,281,029 | B2 | 10/2007 | Rawat |
| 7,287,000 | B2 | 10/2007 | Boyd et al. |
| 7,322,007 | B2 | 1/2008 | Schowtka et al. |
| 7,386,786 | B2 | 6/2008 | Davis et al. |
| 7,401,289 | B2 | 7/2008 | Lachhwani et al. |
| 7,406,429 | B2 | 7/2008 | Salonen |
| 7,433,891 | B2 | 10/2008 | Haber et al. |
| 7,457,693 | B2 | 11/2008 | Olsen et al. |
| 7,477,968 | B1 | 1/2009 | Lowrey |
| 7,480,551 | B1 | 1/2009 | Lowrey et al. |
| 7,496,543 | B1 | 2/2009 | Bamford et al. |
| 7,502,672 | B1 | 3/2009 | Kolls |
| 7,536,641 | B2 | 5/2009 | Rosenstein et al. |
| 7,548,985 | B2 | 6/2009 | Guigui |
| 7,587,504 | B2 | 9/2009 | Adams et al. |
| 7,590,476 | B2 | 9/2009 | Shumate |
| 7,593,925 | B2 | 9/2009 | Cadiz et al. |
| 7,593,999 | B2 | 9/2009 | Nathanson |
| 7,613,627 | B2 | 11/2009 | Doyle et al. |
| 7,620,484 | B1 | 11/2009 | Chen |
| 7,624,342 | B2 | 11/2009 | Matveyenko et al. |
| 7,657,594 | B2 | 2/2010 | Banga et al. |

(56) References Cited

U.S. PATENT DOCUMENTS

| | | | |
|---|---|---|---|
| 7,664,667 | B1 | 2/2010 | Ruppelt et al. |
| 7,739,007 | B2 | 6/2010 | Logsdon |
| 7,747,680 | B2 | 6/2010 | Ravikumar et al. |
| 7,778,841 | B1 | 8/2010 | Bayer et al. |
| 7,801,945 | B1 | 9/2010 | Geddes et al. |
| 7,818,380 | B2 | 10/2010 | Tamura et al. |
| 7,861,309 | B2 | 12/2010 | Spearman et al. |
| 7,865,409 | B1 | 1/2011 | Monaghan |
| 7,870,253 | B2 | 1/2011 | Muilenburg et al. |
| 7,899,701 | B1 | 3/2011 | Odom |
| 7,908,051 | B2 | 3/2011 | Oesterling |
| 7,979,506 | B2 | 7/2011 | Cole |
| 8,010,423 | B2 | 8/2011 | Bodin et al. |
| 8,019,501 | B2 | 9/2011 | Breed |
| 8,036,788 | B2 | 10/2011 | Breed |
| 8,051,159 | B2 | 11/2011 | Muilenburg et al. |
| 8,055,544 | B2 | 11/2011 | Ullman et al. |
| 8,060,274 | B2 | 11/2011 | Boss et al. |
| 8,095,403 | B2 | 1/2012 | Price |
| 8,099,308 | B2 | 1/2012 | Uyeki |
| 8,135,804 | B2 | 3/2012 | Uyeki |
| 8,145,379 | B2 | 3/2012 | Schwinke |
| 8,190,322 | B2 | 5/2012 | Lin et al. |
| 8,209,259 | B2 | 6/2012 | Graham, Jr. et al. |
| 8,212,667 | B2 | 7/2012 | Petite et al. |
| 8,271,473 | B2 | 9/2012 | Berg |
| 8,271,547 | B2 | 9/2012 | Taylor et al. |
| 8,275,717 | B2 | 9/2012 | Ullman et al. |
| 8,285,439 | B2 | 10/2012 | Hodges |
| 8,296,007 | B2 | 10/2012 | Swaminathan et al. |
| 8,311,905 | B1 | 11/2012 | Campbell et al. |
| 8,355,950 | B2 | 1/2013 | Colson et al. |
| 8,407,664 | B2 | 3/2013 | Moosmann et al. |
| 8,428,815 | B2 | 4/2013 | Van Engelshoven et al. |
| 8,438,310 | B2 | 5/2013 | Muilenburg et al. |
| 8,448,057 | B1 | 5/2013 | Sugnet |
| 8,521,654 | B2 | 8/2013 | Ford et al. |
| 8,538,894 | B2 | 9/2013 | Ullman et al. |
| 8,645,193 | B2 | 2/2014 | Swinson et al. |
| 8,676,638 | B1 | 3/2014 | Blair et al. |
| 8,725,341 | B2 | 5/2014 | Ogasawara |
| 8,745,641 | B1 | 6/2014 | Coker |
| 8,849,689 | B1 | 9/2014 | Jagannathan et al. |
| 8,886,389 | B2 | 11/2014 | Edwards et al. |
| 8,924,071 | B2 | 12/2014 | Stanek et al. |
| 8,954,222 | B2 | 2/2015 | Costantino |
| 8,996,230 | B2 | 3/2015 | Lorenz et al. |
| 8,996,235 | B2 | 3/2015 | Singh et al. |
| 9,014,908 | B2 | 4/2015 | Chen et al. |
| 9,015,059 | B2 | 4/2015 | Sims et al. |
| 9,026,304 | B2 | 5/2015 | Olsen, III et al. |
| 9,047,722 | B2 | 6/2015 | Kurnik et al. |
| 9,122,716 | B1 | 9/2015 | Naganathan et al. |
| 9,165,413 | B2 | 10/2015 | Jones et al. |
| 9,183,681 | B2 | 11/2015 | Fish |
| 9,325,650 | B2 | 4/2016 | Yalavarty et al. |
| 9,349,223 | B1 | 5/2016 | Palmer |
| 9,384,597 | B2 | 7/2016 | Koch et al. |
| 9,455,969 | B1 | 9/2016 | Cabrera et al. |
| 9,477,936 | B2 | 10/2016 | Lawson et al. |
| 9,577,866 | B2 | 2/2017 | Rogers et al. |
| 9,596,287 | B2 | 3/2017 | Rybak et al. |
| 9,619,945 | B2 | 4/2017 | Adderly et al. |
| 9,659,495 | B2 | 5/2017 | Modica et al. |
| 9,706,008 | B2 | 7/2017 | Rajan et al. |
| 9,715,665 | B2 | 7/2017 | Schondorf et al. |
| 9,754,304 | B2 | 9/2017 | Taira et al. |
| 9,778,045 | B2 | 10/2017 | Bang |
| 9,836,714 | B2 | 12/2017 | Lander et al. |
| 9,983,982 | B1 | 5/2018 | Kumar et al. |
| 10,032,139 | B2 | 7/2018 | Adderly et al. |
| 10,083,411 | B2 | 9/2018 | Kinsey et al. |
| 10,169,607 | B1 | 1/2019 | Sheth et al. |
| 10,229,394 | B1 | 3/2019 | Davis et al. |
| 10,448,120 | B1 | 10/2019 | Bursztyn et al. |
| 10,475,256 | B2 | 11/2019 | Chowdhury et al. |
| 10,509,696 | B1 | 12/2019 | Gilderman et al. |
| 10,541,938 | B1 | 1/2020 | Timmerman et al. |
| 10,552,871 | B1 | 2/2020 | Chadwick |
| 10,657,707 | B1 | 5/2020 | Leise |
| 10,671,639 | B1 * | 6/2020 | Acheson ............ G06F 16/2246 |
| 11,080,105 | B1 | 8/2021 | Birkett et al. |
| 11,117,253 | B2 | 9/2021 | Oleynik |
| 11,190,608 | B2 | 11/2021 | Amar et al. |
| 11,282,041 | B2 | 3/2022 | Sanderford et al. |
| 11,322,247 | B2 | 5/2022 | Bullington et al. |
| 11,392,855 | B1 | 7/2022 | Murakonda et al. |
| 11,443,275 | B1 | 9/2022 | Prakash et al. |
| 11,468,089 | B1 | 10/2022 | Bales et al. |
| 11,507,892 | B1 | 11/2022 | Henckel et al. |
| 2001/0005831 | A1 | 6/2001 | Lewin et al. |
| 2001/0014868 | A1 | 8/2001 | Herz et al. |
| 2001/0037332 | A1 | 11/2001 | Miller et al. |
| 2001/0039594 | A1 | 11/2001 | Park et al. |
| 2001/0054049 | A1 | 12/2001 | Maeda et al. |
| 2002/0023111 | A1 | 2/2002 | Arora et al. |
| 2002/0024537 | A1 | 2/2002 | Jones et al. |
| 2002/0026359 | A1 | 2/2002 | Long et al. |
| 2002/0032626 | A1 | 3/2002 | DeWolf et al. |
| 2002/0032701 | A1 | 3/2002 | Gao et al. |
| 2002/0042738 | A1 | 4/2002 | Srinivasan et al. |
| 2002/0046245 | A1 | 4/2002 | Hillar et al. |
| 2002/0049831 | A1 | 4/2002 | Platner et al. |
| 2002/0052778 | A1 | 5/2002 | Murphy et al. |
| 2002/0059260 | A1 | 5/2002 | Jas |
| 2002/0065698 | A1 | 5/2002 | Schick et al. |
| 2002/0065739 | A1 | 5/2002 | Florance et al. |
| 2002/0069110 | A1 | 6/2002 | Sonnenberg |
| 2002/0073080 | A1 | 6/2002 | Lipkin |
| 2002/0082978 | A1 | 6/2002 | Ghouri et al. |
| 2002/0091755 | A1 | 7/2002 | Narin |
| 2002/0107739 | A1 | 8/2002 | Schlee |
| 2002/0111727 | A1 | 8/2002 | Vanstory et al. |
| 2002/0111844 | A1 | 8/2002 | Vanstory et al. |
| 2002/0116197 | A1 | 8/2002 | Erten |
| 2002/0116418 | A1 | 8/2002 | Lachhwani et al. |
| 2002/0123359 | A1 | 9/2002 | Wei et al. |
| 2002/0124053 | A1 | 9/2002 | Adams et al. |
| 2002/0128728 | A1 | 9/2002 | Murakami et al. |
| 2002/0129054 | A1 | 9/2002 | Ferguson et al. |
| 2002/0133273 | A1 | 9/2002 | Lowrey et al. |
| 2002/0138331 | A1 | 9/2002 | Hosea et al. |
| 2002/0143646 | A1 | 10/2002 | Boyden et al. |
| 2002/0154146 | A1 | 10/2002 | Rodriquez et al. |
| 2002/0169851 | A1 | 11/2002 | Weathersby et al. |
| 2002/0173885 | A1 | 11/2002 | Lowrey et al. |
| 2002/0188869 | A1 | 12/2002 | Patrick |
| 2002/0196273 | A1 | 12/2002 | Krause |
| 2002/0198761 | A1 | 12/2002 | Ryan et al. |
| 2002/0198878 | A1 | 12/2002 | Baxter et al. |
| 2003/0014443 | A1 | 1/2003 | Bernstein et al. |
| 2003/0023632 | A1 | 1/2003 | Ries et al. |
| 2003/0033378 | A1 | 2/2003 | Needham et al. |
| 2003/0036832 | A1 | 2/2003 | Kokes et al. |
| 2003/0036964 | A1 | 2/2003 | Boyden et al. |
| 2003/0037263 | A1 | 2/2003 | Kamat et al. |
| 2003/0046179 | A1 | 3/2003 | Anabtawi et al. |
| 2003/0051022 | A1 | 3/2003 | Sogabe et al. |
| 2003/0055666 | A1 | 3/2003 | Roddy et al. |
| 2003/0061263 | A1 | 3/2003 | Riddle |
| 2003/0065532 | A1 | 4/2003 | Takaoka |
| 2003/0065583 | A1 | 4/2003 | Takaoka |
| 2003/0069785 | A1 | 4/2003 | Lohse |
| 2003/0069790 | A1 | 4/2003 | Kane |
| 2003/0074392 | A1 | 4/2003 | Campbell et al. |
| 2003/0095038 | A1 | 5/2003 | Dix |
| 2003/0101262 | A1 | 5/2003 | Godwin |
| 2003/0115292 | A1 | 6/2003 | Griffin et al. |
| 2003/0120502 | A1 | 6/2003 | Robb et al. |
| 2003/0145310 | A1 | 7/2003 | Thames et al. |
| 2003/0177050 | A1 | 9/2003 | Crampton et al. |
| 2003/0177175 | A1 | 9/2003 | Worley et al. |
| 2003/0225853 | A1 | 12/2003 | Wang et al. |
| 2003/0229623 | A1 | 12/2003 | Chang et al. |

(56) References Cited

U.S. PATENT DOCUMENTS

2003/0233246 A1 12/2003 Snapp et al.
2004/0012631 A1 1/2004 Skorski
2004/0039646 A1 2/2004 Hacker
2004/0041818 A1 3/2004 White et al.
2004/0073546 A1 4/2004 Forster et al.
2004/0073564 A1 4/2004 Haber et al.
2004/0088228 A1 5/2004 Mercer et al.
2004/0093243 A1 5/2004 Bodin et al.
2004/0117046 A1 6/2004 Colle et al.
2004/0122735 A1 6/2004 Meshkin et al.
2004/0128320 A1 7/2004 Grove et al.
2004/0139203 A1 7/2004 Graham, Jr. et al.
2004/0148342 A1 7/2004 Cotte
2004/0156020 A1 8/2004 Edwards
2004/0163047 A1 8/2004 Nagahara et al.
2004/0181464 A1 9/2004 Vanker et al.
2004/0199413 A1 10/2004 Hauser et al.
2004/0220863 A1 11/2004 Porter et al.
2004/0225664 A1 11/2004 Casement
2004/0230897 A1 11/2004 Latzel
2004/0255233 A1 12/2004 Croney et al.
2004/0267263 A1 12/2004 May
2004/0268225 A1 12/2004 Walsh et al.
2004/0268232 A1 12/2004 Tunning
2005/0015491 A1 1/2005 Koeppel
2005/0021197 A1 1/2005 Zimmerman et al.
2005/0027611 A1 2/2005 Wharton
2005/0043614 A1 2/2005 Huizenga et al.
2005/0065804 A1 3/2005 Worsham et al.
2005/0096963 A1 5/2005 Myr et al.
2005/0108112 A1 5/2005 Ellenson et al.
2005/0108637 A1 5/2005 Sahota et al.
2005/0114270 A1 5/2005 Hind et al.
2005/0114764 A1 5/2005 Gudenkauf et al.
2005/0149398 A1 7/2005 Mckay
2005/0171836 A1 8/2005 Leacy
2005/0176482 A1 8/2005 Raisinghani et al.
2005/0187834 A1 8/2005 Painter et al.
2005/0198121 A1 9/2005 Daniels et al.
2005/0228736 A1 10/2005 Norman et al.
2005/0256755 A1 11/2005 Chand et al.
2005/0267774 A1 12/2005 Merritt et al.
2005/0268282 A1 12/2005 Laird
2005/0289020 A1 12/2005 Bruns et al.
2005/0289599 A1 12/2005 Matsuura et al.
2006/0004725 A1 1/2006 Abraido-fandino
2006/0031811 A1 2/2006 Ernst et al.
2006/0059253 A1 3/2006 Goodman et al.
2006/0064637 A1 3/2006 Rechterman et al.
2006/0123330 A1 6/2006 Horiuchi et al.
2006/0129423 A1 6/2006 Sheinson et al.
2006/0129982 A1 6/2006 Doyle
2006/0136105 A1 6/2006 Larson
2006/0161841 A1 7/2006 Horiuchi et al.
2006/0200751 A1 9/2006 Underwood et al.
2006/0224447 A1 10/2006 Koningstein
2006/0248205 A1 11/2006 Randle et al.
2006/0248442 A1 11/2006 Rosenstein et al.
2006/0265355 A1 11/2006 Taylor
2006/0271844 A1 11/2006 Suklikar
2006/0277588 A1 12/2006 Harrington et al.
2006/0282328 A1 12/2006 Gerace et al.
2006/0282547 A1 12/2006 Hasha et al.
2007/0005446 A1 1/2007 Fusz et al.
2007/0016486 A1 1/2007 Stone et al.
2007/0027754 A1 2/2007 Collins et al.
2007/0033087 A1 2/2007 Combs et al.
2007/0033520 A1 2/2007 Kimzey et al.
2007/0053513 A1 3/2007 Hoffberg
2007/0100519 A1 5/2007 Engel
2007/0150368 A1 6/2007 Arora et al.
2007/0209011 A1 9/2007 Padmanabhuni et al.
2007/0226540 A1 9/2007 Konieczny
2007/0250229 A1 10/2007 Wu
2007/0250327 A1 10/2007 Hedy
2007/0250840 A1 10/2007 Coker et al.
2007/0271154 A1 11/2007 Broudy et al.
2007/0271330 A1 11/2007 Mattox et al.
2007/0271389 A1 11/2007 Joshi et al.
2007/0282711 A1 12/2007 Ullman et al.
2007/0282712 A1 12/2007 Ullman et al.
2007/0282713 A1 12/2007 Ullman et al.
2007/0288413 A1 12/2007 Mizuno et al.
2007/0294192 A1 12/2007 Tellefsen
2007/0299940 A1 12/2007 Gbadegesin et al.
2008/0010561 A1 1/2008 Bay et al.
2008/0015921 A1 1/2008 Libman
2008/0015929 A1 1/2008 Koeppel et al.
2008/0027827 A1 1/2008 Eglen et al.
2008/0119983 A1 5/2008 Inbarajan et al.
2008/0172632 A1 7/2008 Stambaugh
2008/0189143 A1 8/2008 Wurster
2008/0195435 A1 8/2008 Bentley et al.
2008/0195932 A1 8/2008 Oikawa et al.
2008/0201163 A1 8/2008 Barker et al.
2008/0255925 A1 10/2008 Vailaya et al.
2009/0012887 A1 1/2009 Taub et al.
2009/0024918 A1 1/2009 Silverbrook et al.
2009/0043780 A1 2/2009 Hentrich, Jr. et al.
2009/0070435 A1 3/2009 Abhyanker
2009/0089134 A1 4/2009 Uyeki
2009/0106036 A1 4/2009 Tamura et al.
2009/0112687 A1 4/2009 Blair et al.
2009/0138329 A1 5/2009 Wanker
2009/0182232 A1 7/2009 Zhang et al.
2009/0187513 A1 7/2009 Noy et al.
2009/0187939 A1 7/2009 Lajoie
2009/0198507 A1 8/2009 Rhodus
2009/0204454 A1 8/2009 Lagudi
2009/0204655 A1 8/2009 Wendelberg
2009/0222532 A1 9/2009 Finlaw
2009/0265607 A1 10/2009 Raz et al.
2009/0313035 A1 12/2009 Esser et al.
2010/0011415 A1 1/2010 Cortes et al.
2010/0023393 A1 1/2010 Costy et al.
2010/0070343 A1 3/2010 Taira et al.
2010/0082778 A1 4/2010 Muilenburg et al.
2010/0082780 A1 4/2010 Muilenburg et al.
2010/0088158 A1 4/2010 Pollack
2010/0100259 A1 4/2010 Geiter
2010/0100506 A1 4/2010 Marot
2010/0131363 A1 5/2010 Sievert et al.
2010/0235219 A1 9/2010 Merrick et al.
2010/0235231 A1 9/2010 Jewer
2010/0293030 A1 11/2010 Wu
2010/0312608 A1 12/2010 Shan et al.
2010/0318408 A1 12/2010 Sankaran et al.
2010/0324777 A1 12/2010 Tominaga et al.
2011/0010432 A1 1/2011 Uyeki
2011/0015989 A1 1/2011 Tidwell et al.
2011/0022525 A1 1/2011 Swinson et al.
2011/0082804 A1 4/2011 Swinson et al.
2011/0145064 A1 6/2011 Anderson et al.
2011/0161167 A1 6/2011 Jallapuram
2011/0191264 A1 8/2011 Inghelbrecht et al.
2011/0196762 A1 8/2011 DuPont
2011/0224864 A1 9/2011 Gellatly et al.
2011/0231055 A1 9/2011 Knight et al.
2011/0246417 A1* 10/2011 Maya ...................... G06F 16/27 707/610
2011/0288937 A1 11/2011 Manoogian, III
2011/0307296 A1 12/2011 Hall et al.
2011/0307411 A1 12/2011 Bolivar et al.
2012/0066010 A1 3/2012 Williams et al.
2012/0079502 A1* 3/2012 Kwan ....................... G06F 8/71 718/106
2012/0089474 A1 4/2012 Xiao et al.
2012/0095804 A1 4/2012 Calabrese et al.
2012/0116868 A1 5/2012 Chin et al.
2012/0158211 A1 6/2012 Chen et al.
2012/0209714 A1 8/2012 Douglas et al.
2012/0221125 A1 8/2012 Bell
2012/0265648 A1 10/2012 Jerome et al.
2012/0268294 A1 10/2012 Michaelis et al.

(56) References Cited

U.S. PATENT DOCUMENTS

2012/0278886 A1 11/2012 Luna
2012/0284113 A1 11/2012 Pollak
2012/0316981 A1 12/2012 Hoover et al.
2013/0046432 A1 2/2013 Edwards et al.
2013/0080196 A1 3/2013 Schroeder et al.
2013/0080305 A1 3/2013 Virag et al.
2013/0137470 A1* 5/2013 Schultz, Jr. ............ G06Q 10/00 707/E17.014
2013/0151334 A1 6/2013 Berkhin et al.
2013/0151468 A1 6/2013 Wu et al.
2013/0191445 A1 7/2013 Gayman et al.
2013/0204484 A1 8/2013 Ricci
2013/0226699 A1 8/2013 Long
2013/0317864 A1 11/2013 Tofte et al.
2013/0325541 A1 12/2013 Capriotti et al.
2013/0332023 A1 12/2013 Bertosa et al.
2014/0012659 A1 1/2014 Yan
2014/0026037 A1 1/2014 Garb et al.
2014/0052327 A1 2/2014 Hosein et al.
2014/0081675 A1 3/2014 Ives et al.
2014/0088866 A1 3/2014 Knapp et al.
2014/0094992 A1 4/2014 Lambert et al.
2014/0122178 A1 5/2014 Knight
2014/0136278 A1 5/2014 Carvalho
2014/0229207 A1 8/2014 Swamy et al.
2014/0229391 A1 8/2014 East et al.
2014/0244110 A1 8/2014 Tharaldson et al.
2014/0277906 A1 9/2014 Lowrey et al.
2014/0278805 A1 9/2014 Thompson
2014/0316825 A1 10/2014 Van Dijk et al.
2014/0324275 A1 10/2014 Stanek et al.
2014/0324536 A1 10/2014 Cotton
2014/0331301 A1 11/2014 Subramani et al.
2014/0337163 A1 11/2014 Whisnant
2014/0337825 A1 11/2014 Challa et al.
2014/0379530 A1 12/2014 Kim et al.
2014/0379817 A1 12/2014 Logue et al.
2015/0032546 A1 1/2015 Calman et al.
2015/0057875 A1 2/2015 McGinnis et al.
2015/0058151 A1 2/2015 Sims et al.
2015/0066781 A1 3/2015 Johnson et al.
2015/0066933 A1 3/2015 Kolodziej et al.
2015/0100199 A1 4/2015 Kurnik et al.
2015/0142256 A1 5/2015 Jones
2015/0142535 A1 5/2015 Payne et al.
2015/0207701 A1 7/2015 Faaborg et al.
2015/0227894 A1 8/2015 Mapes, Jr. et al.
2015/0242819 A1 8/2015 Moses et al.
2015/0248761 A1 9/2015 Dong et al.
2015/0254591 A1 9/2015 Raskind
2015/0268059 A1 9/2015 Borghesani et al.
2015/0268975 A1 9/2015 Du et al.
2015/0278886 A1 10/2015 Fusz
2015/0286475 A1 10/2015 Vangelov et al.
2015/0286979 A1 10/2015 Ming et al.
2015/0290795 A1 10/2015 Oleynik
2015/0334165 A1 11/2015 Arling et al.
2016/0004516 A1 1/2016 Ivanov et al.
2016/0059412 A1 3/2016 Oleynik
2016/0071054 A1 3/2016 Kakarala et al.
2016/0092944 A1 3/2016 Taylor et al.
2016/0132935 A1 5/2016 Shen et al.
2016/0140609 A1 5/2016 Demir
2016/0140620 A1 5/2016 Pinkowish et al.
2016/0140622 A1 5/2016 Wang et al.
2016/0148439 A1 5/2016 Akselrod et al.
2016/0162817 A1 6/2016 Grimaldi et al.
2016/0179968 A1 6/2016 Ormseth et al.
2016/0180358 A1 6/2016 Battista
2016/0180378 A1 6/2016 Toshida et al.
2016/0180418 A1 6/2016 Jaeger
2016/0267503 A1 9/2016 Zakai-or et al.
2016/0275533 A1 9/2016 Smith et al.
2016/0277510 A1 9/2016 Du et al.
2016/0307174 A1 10/2016 Marcelle et al.
2016/0335727 A1 11/2016 Jimenez
2016/0337278 A1 11/2016 Peruri et al.
2016/0357599 A1 12/2016 Glatfelter et al.
2016/0371641 A1 12/2016 Wilson et al.
2017/0034547 A1 2/2017 Jain et al.
2017/0039785 A1 2/2017 Richter et al.
2017/0053460 A1 2/2017 Hauser et al.
2017/0060929 A1 3/2017 Chesla et al.
2017/0064038 A1 3/2017 Chen
2017/0093700 A1 3/2017 Gilley et al.
2017/0124525 A1 5/2017 Johnson et al.
2017/0126848 A1 5/2017 George et al.
2017/0206465 A1 7/2017 Jin et al.
2017/0262894 A1 9/2017 Kirti et al.
2017/0277437 A1* 9/2017 Jones .................... G06F 16/178
2017/0293894 A1 10/2017 Taliwal et al.
2017/0308844 A1 10/2017 Kelley
2017/0308864 A1 10/2017 Kelley
2017/0308865 A1 10/2017 Kelley
2017/0316459 A1 11/2017 Strauss et al.
2017/0337573 A1 11/2017 Toprak
2017/0352054 A1 12/2017 Ma et al.
2017/0359216 A1 12/2017 Naiden et al.
2017/0364733 A1 12/2017 Estrada et al.
2018/0067932 A1 3/2018 Paterson et al.
2018/0074864 A1 3/2018 Chen et al.
2018/0095733 A1 4/2018 Torman et al.
2018/0173806 A1 6/2018 Forstmann et al.
2018/0204281 A1 7/2018 Painter et al.
2018/0225710 A1 8/2018 Kar et al.
2018/0232749 A1 8/2018 Moore, Jr. et al.
2018/0285901 A1 10/2018 Zackrone
2018/0285925 A1 10/2018 Zackrone
2018/0300124 A1 10/2018 Malladi et al.
2019/0028360 A1 1/2019 Douglas et al.
2019/0073641 A1 3/2019 Utke
2019/0114330 A1 4/2019 Xu et al.
2019/0139637 A1* 5/2019 Ceh ...................... G06Q 10/087
2019/0213426 A1 7/2019 Chen et al.
2019/0294878 A1 9/2019 Endras et al.
2019/0297162 A1 9/2019 Amar et al.
2019/0334884 A1 10/2019 Ross et al.
2020/0019388 A1 1/2020 Jaeger et al.
2020/0038363 A1 2/2020 Kim
2020/0050879 A1 2/2020 Zaman et al.
2020/0066067 A1 2/2020 Herman et al.
2020/0118365 A1 4/2020 Wang et al.
2020/0177476 A1 6/2020 Agarwal et al.
2020/0327371 A1 10/2020 Sharma et al.
2021/0072976 A1 3/2021 Chintagunta et al.
2021/0090694 A1 3/2021 Colley et al.
2021/0157562 A1 5/2021 Sethi et al.
2021/0184780 A1 6/2021 Yang et al.
2021/0224975 A1 7/2021 Ranca et al.
2021/0240657 A1 8/2021 Kumar et al.
2021/0256616 A1 8/2021 Hayard et al.
2021/0287106 A1 9/2021 Jerram
2021/0303644 A1 9/2021 Shear
2021/0350334 A1 11/2021 Ave et al.
2021/0359940 A1 11/2021 Shen et al.
2022/0020086 A1 1/2022 Kuchenbecker et al.
2022/0028928 A1 1/2022 Seo et al.
2022/0046105 A1 2/2022 Amar et al.
2022/0172723 A1 6/2022 Tendolkar et al.
2022/0191663 A1 6/2022 Karpoor et al.
2022/0208319 A1 6/2022 Ansari et al.
2022/0237084 A1 7/2022 Bhagi et al.
2022/0237171 A1 7/2022 Bailey et al.
2022/0293107 A1 9/2022 Leaman et al.
2022/0300735 A1 9/2022 Kelly et al.
2023/0214892 A1 7/2023 Christian et al.

OTHER PUBLICATIONS http://web.archive.org/web/20050305055408/http://www.dealerclick.com/, 1 pg., 2005.
http://web.archive.org/web/20050528073821/http://www.kbb.com/, 1 pg., 2005.

(56) References Cited

OTHER PUBLICATIONS http://web.archive.org/web/20050531000823/http://www.carfax.com/, 1 pg., 2005.
Internet Archive Dan Gillmor Sep. 1, 1996.
Internet Archive Wayback Machine, archive of LDAP Browser.com1—FAQ. Archived Dec. 11, 2000. Available at <http://web.archive.org/web/20001211015 2/http://www.ldapbrowser.com/faq/faq.php3?sID=fe4ae66f023d86909f35e974f3a1ce>.
Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.
Internet Archive: Audio Archive, http://www.archive.org/audio/audio-searchresults.php?search=@start=0&limit=100&sort=ad, printed May 12, 2004, 12 pgs.
Internet Archive: Democracy Now, http://www.archive.org/audio/collection.php?collection=democracy_now, printed May 12, 2004, 2 pgs.
Java 2 Platform, Enterprise Edition (J2EE) Overview, printed Mar. 6, 2010, 3 pgs.
Java version history—Wikipedia, the free encyclopedia, printed Mar. 6, 2010, 9 pgs.
Permissions in the Java™ 2 SDK, printed Mar. 6, 2010, 45 pgs.
"An Appointment with Destiny—The Time for Web-Enabled Scheduling has Arrived", Link Fall, 2007, 2 pages.
"How a Solution found a Problem of Scheduling Service Appointments", Automotive News, 2016, 4 pages.
"IBM Tivoli Access Manager Base Administration Guide", Version 5.1. International Business Machines Corporation. Entire book enclosed and cited., 2003, 402 pgs.
"NetFormx Offers Advanced Network Discovery Software", PR Newswire. Retrieved from http://www.highbeam.com/doc/1G1-54102907.html>., Mar. 15, 1999.
"Openbay Announces First-of-its-Kind Connected Car Repair Service", openbay.com, Mar. 31, 2015, 14 pages.
"Service Advisor", Automotive Dealership Institute, 2007, 26 pages.
"xTime.com Web Pages", Jan. 8, 2015, 1 page.
"XTimes Newsletter", vol. 7, 2013, 4 pages.
Aloisio, Giovanni et al., "Web-based access to the Grid using the Grid Resource Broker portal", Google, 2002, pp. 1145-1160.
Anonymous, , "Software ready for prime time", Automotive News. Detroit, vol. 76, Issue 5996, Nov. 5, 2001, p. 28.
Bedell, Doug , Dallas Morning News, "I Know Someone Who Knows Kevin Bacon". Oct. 27, 1998. 4 pgs.
Chadwick, D.W. , "Understanding X.500—The Directory", Available at <http://sec.cs.kent.ac.uk/x500book/>. Entire work cited., 1996.
Chatterjee, Pallab et al., "On-board diagnostics not just for racing anymore", EDN.com, May 6, 2013, 7 pages.
Chen, Deren , "Business to Business Standard and Supply Chain System Framework in Virtual Enterprises", Computer Supported Cooperative Work in Design, The Sixth International Conference on 2001, pp. 472-476.
Clemens Grelck, , "A Multithread Compiler Backend for High-Level Array Programming", 2003.
CNY Business Journal, , "Frank La Voila named Southern Tier Small-Business Person of 1999", Jun. 11, 1999, 2 pages.
Croswell, Wayne , "Service Shop Optimiztion", Modern Tire Retailer, May 21, 2013, 7 pages.
Davis, Peter T. et al., "Sams Teach Yourself Microsoft Windows NT Server 4 in 21 Days", Sams® Publishing, ISBN: 0-672-31555-6, 1999, printed Dec. 21, 2008, 15 pages.
Derfler, Frank J. et al., "How Networks Work: Millennium Edition", Que, A Division of Macmillan Computer Publishing, ISBN: 0-7897-2445-6, 2000, 9 pages.
Drawbaugh, Ben , "Automatic Link Review: an expensive way to learn better driving habits", Endgadget.com, Nov. 26, 2013, 14 pages.
Emmanuel, Daniel , "Basics to Creating an Appointment System for Automotive Service Customers", Automotiveservicemanagement.com, 2006, 9 pages.
Hogue, et al., "Thresher: Automating the Unwrapping of Semantic Content from the World Wide Web", ACM, 2005, pp. 86-95.
Housel, Barron C. et al., "WebExpress: A client/intercept based system for optimizing Web browsing in a wireless environment", Google, 1998, pp. 419-431.
Hu, Bo , "A Platform based Distributed Service Framework for Large-scale Cloud Ecosystem Development", IEEE Computer Society, 2015, 8 pages.
Interconnection, , In Roget's II The New Thesaurus. Boston, MA: Houghton Mifflin http://www.credoreference.com/entry/hmrogets/interconnection, 2003, Retrieved Jul. 16, 2009, 1 page.
Jenkins, Will , "Real-time vehicle performance monitoring with data intergrity", A Thesis Submitted to the Faculty of Mississippi State University, Oct. 2006, 57 pages.
Johns, Pamela et al., "Competitive intelligence in service marketing", Marketing Intelligence & Planning, vol. 28, No. 5, 2010, pp. 551-570.
Lavrinc, Damon , "First Android-powered infotainment system coming to 2012 Saab 9-3", Autoblog.com, Mar. 2, 2011, 8 pages.
Lee, Adam J. et al., "Searching for Open Windows and Unlocked Doors: Port Scanning in Large-Scale Commodity Clusters", Cluster Computing and the Grid, 2005. IEEE International Symposium on vol. 1, 2005, pp. 146-151.
Michener, J.R. et al., "Managing System and Active-Content Integrity", Computer; vol. 33, Issue: 7, 2000, pp. 108-110.
Milic-Frayling, Natasa et al., "SmartView: Enhanced Document Viewer for Mobile Devices", Google, Nov. 15, 2002, 11 pages.
Needham, Charlie , "Google Now Taking Appointments for Auto Repair Shops", Autoshopsolutions.com, Aug. 25, 2015, 6 pages.
Open Bank Project, , https://www.openbankproject.com/, retrieved Nov. 23, 2020, 10 pages.
openbay.com Web Pages, , Openbay.com, retrieved from archive.org, May 14, 2019, Mar. 2015, 11 pages.
openbay.com Web Pages, , Openbay.com, retrieved from archive.org on May 14, 2019, Feb. 2014, 2 pages.
openbay.com Web Pages, , Openbay.com, retrieved from archive.org May 14, 2019, Apr. 2015, 6 pages.
Phelan, Mark , "Smart phone app aims to automate car repairs", Detroit Free Press Auto Critic, Mar. 31, 2015, 2 pages.
Pubnub Staff, , "Streaming Vehicle Data in Realtime with Automatic (Pt 1)", Pubnub.com, Aug. 17, 2015, 13 pages.
Standards for Technology in Auto, , https://www.starstandard.org/, retrieved Nov. 23, 2020, 4 pages.
Strebe, Matthew et al., MCSE: NT Server 4 Study Guide, Third Edition. SYBEX Inc. Front matter, 2000, pp. 284-293, and 308-347.
Warren, Tamara , "This Device Determines What Ails Your Car and Finds a Repair Shop—Automatically", CarAndDriver.com, Apr. 8, 2015, 7 pages.
You, Song et al., "Overview of Remote Diagnosis and Maintenance for Automotive Systems", 2005 SAE World Congress, Apr. 11-14, 2015, 10 pages.

* cited by examiner

METHODS OF SYNCHRONIZING HIERARCHICAL DATABASES AND RELATED COMPUTING SYSTEMS

TECHNICAL FIELD

This disclosure relates generally to methods of synchronizing one or more destination hierarchical databases with one or more source hierarchical databases and related computing systems.

BACKGROUND

In an increasingly digital world, more and more databases are being used. The need to transfer information from one database to another is common across various industries.

BRIEF SUMMARY

In some embodiments, a computing system includes one or more processors and one or more data storage devices operably coupled to the one or more processors. The one or more data storage devices include one or more source hierarchical databases stored on the one or more data storage devices. The source hierarchical data is organized into two or more hierarchical levels including a highest level and one or more sub-levels. The one or more data storage devices also include one or more destination hierarchical databases stored on the one or more data storage devices. The one or more destination hierarchical databases include destination hierarchical data organized into the two or more hierarchical levels. The one or more data storage devices further include computer-readable instructions stored on the one or more data storage devices. The computer-readable instructions are configured to instruct the one or more processors to generate one or more messages including objects corresponding to sub-portions of the source hierarchical data. The objects include entity identifications. Those of the objects corresponding to the one or more sub-levels each further include a parent identification indicating an entity identification of an object in a higher hierarchical level. The computer-readable instructions are also configured to change the destination hierarchical data responsive to the objects from the one or more messages within the two or more hierarchical levels.

In some embodiments, a method of synchronizing one or more destination hierarchical databases to one or more source hierarchical databases includes detecting a change to source hierarchical data stored by the one or more source hierarchical databases. The source hierarchical data is organized into two or more hierarchical levels including a highest level and one or more sub-levels. The method also includes generating one or more messages, each message including an object. The object corresponds to a segment of the changed source hierarchical data. The object includes an entity identification and a change data operation. The object further includes a parent identification if the changed source hierarchical data of the object is from the one or more sub-levels. The method further includes changing the destination hierarchical data responsive to the one or more messages.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
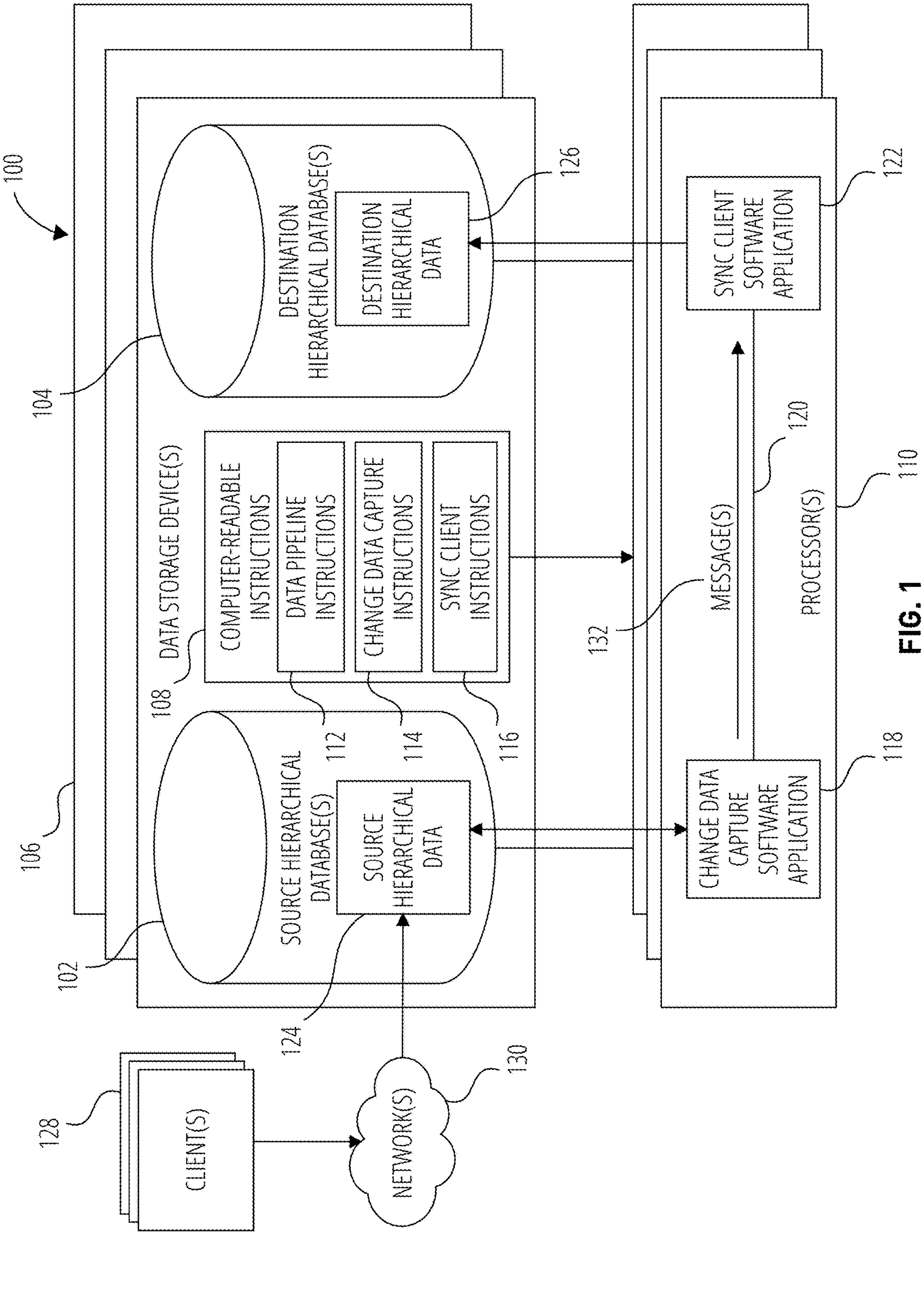
FIG. 1 is a block diagram of a computing system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances, similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example" means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

One challenge that arises in synchronizing one or more destination hierarchical databases with one or more source hierarchical databases is handling of asynchronous information received at the one or more destination hierarchical databases in an order that is not conducive to the hierarchical structure used by the source hierarchical databases and the destination hierarchical databases. For example, an addition to the source hierarchical databases may include an addition of two segments of data with a first segment of the data being a parent in the hierarchy to a second segment of the data. If the second segment of the data arrives at the destination hierarchical databases before the first segment of data, it may be impossible to properly store the second segment of data according to the hierarchy because the appropriate corresponding parent data may not yet exist in the destination database. Conventional database software does not know what to do with hierarchical information received in an order that is not conducive to the hierarchy. Accordingly, asynchronous delivery in communicating information between hierarchical databases may result in lost information and/or breaks in hierarchical relationships that should exist between segments of information.

Embodiments disclosed herein enable handling of asynchronous messaging between hierarchical databases. In some embodiments, the hierarchical databases may be appointment databases. In such embodiments, appointments may be synchronized between multiple databases in which both source databases and destination databases have concurrent writes, including handling:

- rejection of trivial updates (e.g., updates from source databases where only modification timestamp changes relative to information already stored in the destination databases);
- data reconstruction across parent, child, and grandchild relationships;
- consistent reconstruction of data from different source databases and tables into a single destination database table given unpredictable arrival order of messages across multiple topics;

rejection of stale updates (e.g., newer data is not overwritten by older data), correct handling of parent-child relationships; and reprocessing data, in some cases, when new messages arrive.

In some embodiments, publish-subscribe messaging may be used with change data detection and data synchronization. In some embodiments, these techniques may be applied to an appointment domain. Integration logic used in embodiments disclosed herein may be generic to enable addition of new source and destination tables into the system by adding new data processors for messages in a topic.

In some embodiments, a computing system involves multiple source databases that can be written to from multiple clients (e.g., monolithic applications like CDK Service, database integration jobs, or web APIs). The data to be synchronized is written to the source databases. A change data capture system is used to detect changes to the source tables to be synchronized. Changes are pushed into a data pipeline as individual topics per database and table for consumption by a synchronization client.

The synchronization client subscribes to the topics into which change data is pushed. Upon receiving a message from any of the topics, the synchronization client writes a message to a log table to persist the message for further processing. The sync client inspects the message to determine the type of message processor that can handle the message. Messages have a few data elements that are critical to the operation of the system, including entity identification (e.g., the identification of the object in question), the parent identification (e.g., the identification of any parent object used to establish object hierarchy), a created timestamp, a modification timestamp, the data change operation (e.g., create, update, delete), and an identifier that describes the type of the message as well as any data fields relevant to the object.

Once the message processor is constructed, the synchronization client then inspects the type of change operation to be performed: create, update, or delete. Much of the core logic is centralized in a base processor and can be overridden or extended by specific subclasses. For create messages, if the message has a parent identification, the system will look for the parent object by entity identification in the destination database. If the parent identification is not found, the message will be marked as "pending" status and the processing will stop for the message. If the parent identification does exist in the destination database, the message will be parsed into an object and the object data will be persisted into the appropriate table in the destination database. Once the message is inserted, the synchronization client will process any pending messages for the current object and query the database for any pending objects for which the entity identification of the current object is the parent identification. If there are any pending messages present in the log table for which the entity identification of this object is the parent identification, the system will retrieve those messages and recursively apply the data processing logic by finding the appropriate data processor, and processing the message based on the operation included in the message, including handling any pending messages for those child objects and their children. If a create message is processed and an object with the same entity identification already exists the database, the data processor will mark the message skipped and no further processing will be performed on the current object.

For update messages, if a corresponding object does not already exist in the database (e.g., the update does not have a prior create), the update will be handled as a create. If the update is considered "trivial" (e.g., not of sufficient business value, or data already matches before and after an update in the source database for fields that are relevant to the destination database), the update is skipped. Specific data processor implementation may define their own logic for what constitutes a "trivial" update. The processor will determine if the update will proceed based on whether the update timestamp of the entity is the destination database is present and is earlier than the update timestamp of the message. If the update should not proceed, the message is marked skipped. If the update does proceed, pending messages for the object and child objects are processed recursively.

For delete messages, if the object does not exist and the message has no parent identification, the message is skipped. If the object does not exist and the parent identification is present in the message, but the message log has a successful deletion message that has previously been processed, the message will be skipped because deletion of the parent object will have cascaded to the child records in the destination database and thus this deletion message is extraneous. If the object does not exist, the parent identification exists, and has not been deleted, an additional check is performed that may be implemented in data processor implementations to determine if the deletion should be marked "pending" based on specific business logic. This allows the message to be reprocessed later if a message related to this object or its parent identification arrives in the future. If the message should not be marked as pending, the message is marked as skipped. If the object does exist in the database and the modification timestamp of the message is equal or later than the target object, the object is deleted. If the object in the database has been modified more recently than the deletion message modification timestamp, the deletion is skipped.

Additionally, there may be a significant amount of logic to handle a specific case in the system where there are tables in different databases that are used to reconstruct a single highest hierarchical level object (e.g., an appointment) in the destination database. The messages for create and delete from a first source and a second source table can arrive in any order, but the system makes sure that creates and deletes for the same object in the same table arrive in linear order in time. Messages from different topics can arrive before, after or interleaved with one another.

FIG. 1 is a block diagram of a computing system 100, according to some embodiments. The computing system 100 includes one or more data storage devices 106 operably coupled to one or more processors 110, one or more clients 128, and one or more networks 130. The data storage devices 106 include one or more source hierarchical databases 102, one or more destination hierarchical databases 104, and computer-readable instructions 108 stored on the one or more data storage devices 106. The one or more source hierarchical databases 102 include source hierarchical data 124 organized into two or more hierarchical levels including a highest level and one or more sub-levels. The one or more destination hierarchical databases 104 include destination hierarchical data 126 organized into the two or more hierarchical levels.

The computer-readable instructions 108 include data pipeline instructions 112, change data capture instructions 114, and synchronization client instructions 116. The data pipeline instructions 112 are configured to instruct the one or more processors 110 to create a data pipeline 120. The data pipeline 120 may be a distributed streaming platform that enables real-time data pipelines and event-driven applications by efficiently handling the production, processing, and storage of large volumes of log or event data across multiple producers and consumers. One example of existing software for such a data pipeline 120 is Apache Kafka, an open-source system developed by the Apache Software Foundation, based in Wakefield, Massachusetts.

The change data capture instructions 114 are configured to instruct the one or more processors 110 to execute a change data capture software application 118. The change data capture software application 118 may be used to detect changes (e.g., creations, updates, deletions) to the source hierarchical data 124 (e.g., source tables) and generate one or more messages 132 comprising objects corresponding to sub-portions of the source hierarchical data 124. The objects include entity identifications. Those of the objects corresponding to the one or more sub-levels each further include a parent identification indicating an entity identification of an object in a higher hierarchical level to create a hierarchical relationship between the objects according to the one or more hierarchical levels the one or more source hierarchical databases 102 and the one or more destination hierarchical databases 104 are organized into. The change data capture software application 118 is configured to push the messages 132 to the data pipeline 120 for consumption by a synchronization client software application 122.

The change data capture software application 118 may include a distributed platform that uses change data capture (CDC) to monitor and stream real-time changes from the one or more source hierarchical databases 102 into the data pipeline 120, allowing for event-driven architectures and data synchronization between the source hierarchical data 124 and the destination hierarchical data 126. One example of such a change data capture software application 118 is Debezium, an open-source system developed by the Debezium Community, which is a project owned and sponsored by Red Hat, Inc., of Raleigh, North Carolina.

The synchronization client instructions 116 are configured to instruct the one or more processors 110 to execute the synchronization client software application 122. The synchronization client software application 122 is configured to change the destination hierarchical data 126 responsive to the objects from the one or more message 132 within the two or more hierarchical levels. The synchronization client software application 122 may subscribe to the topics into which change data is published by the change data capture software application 118. Upon receiving a message 132 from one of the topics, the synchronization client software application 122 writes a message to a log table to persist the message 132 for further processing. The synchronization client software application 122 inspects the message 132 to determine the type of message processor that can handle the message 132. A message 132 may include data elements such as an entity identification, a parent identification, a created timestamp, a modification timestamp, a data change operation (e.g., create, update, delete), and an identifier that describes the type of the message, as well as any data fields relevant to the object. The message 132 may be processed to make changes to the one or more destination hierarchical databases 104 (e.g., using the method 300 of FIG. 3A, FIG. 3B, and FIG. 3C).

The one or more clients 128 may include devices used to modify the source hierarchical data 124 of the one or more source hierarchical databases 102. For example, the one or more clients 128 may include computers, tablet computers, mobile devices (e.g., smart phones), point of sale devices, other devices, or combinations thereof. The one or more clients 128 may make changes to the source hierarchical data 124 via communications through the one or more networks 130. In a specific, non-limiting example, the computing system 100 may include an appointment domain including multiple source databases (e.g., the one or more source hierarchical databases 102 may be multiple source appointment databases) that may be written to from multiple different clients 128 (e.g., via monolithic software applications, database integration jobs, web application programming interfaces (APIs), etc.). The one or more clients 128 may create, update, or delete the source hierarchical data 124 stored in the one or more source hierarchical databases 102.

For example, the one or more clients 128 may make changes to the source hierarchical data 124 to schedule service appointments for vehicle service businesses (e.g., vehicle dealerships). Data corresponding to service appointments may be stored according to a hierarchical organization. For example, a highest level of a hierarchical structure may be designated for details of appointment jobs (e.g., scheduled service appointments). A second highest level (e.g., a highest of one or more sub-levels below the highest level) may be designated for details regarding services (e.g., specific types of repairs or maintenance tasks) for appointment jobs of the highest level. In other words, the second highest level of the two or more hierarchical levels corresponds to included services for appointment jobs of the highest level. A third highest level (e.g., a second highest of the one or more sub-levels) may be designated for details regarding parts, equipment, or other resources needed to perform the services in the second highest level. Accordingly, the third highest level of the two or more hierarchical levels corresponds at least to parts for services of the second highest level of the two or more hierarchical levels.

Items stored within the source hierarchical data 124 may have entity identifications associated therewith to identify those items. These entity identifications may be stored in the source hierarchical data 124. The hierarchy for the source hierarchical data 124 may be defined using parent-child relationships between items in the different hierarchical levels. For items stored in the one or more sub-levels, parent identifications may be associated therewith to indicate which item(s) in the hierarchical level above is/are parent(s) within the hierarchy. The parent identifications may also be stored in the source hierarchical data 124. Items stored in the highest level do not have parent identifications associated therewith.

As a specific, non-limiting example, data (e.g., vehicle information, date of appointment, time of appointment, etc.) corresponding to a first appointment job for a first vehicle may be stored in the highest level of the source hierarchical data 124. The first appointment job is associated with a first entity identification stored in the source hierarchical data 124. Since the first appointment job is in the highest level of the hierarchy, no parent identification is associated with the first appointment job. Data corresponding to a first service (e.g., an oil change) to be performed on the first vehicle during the first appointment job may be stored in the second highest level of the source hierarchical data 124. A second entity identification may be associated with the first service. Also, a first parent identification identifying the first entity identification of the first appointment job may be associated with the first service to indicate that there is a parent-child relationship between the first appointment job and the first service. If other services are to be performed on the vehicle for the first appointment job, data corresponding to those services may be stored in the second highest level along with parent identifications indicating the first entity identification of the first appointment job. Data indicating a first resource item (e.g., replacement engine oil) to be used for the first service (e.g., the oil change) may be stored in a third highest level of the source hierarchical data 124. A third entity identification may be associated with the first resource item. Also, a parent identification indicating the second entity identification of the first service may be associated with the first resource item to indicate a parent-child relationship between the first service and the first resource item. Other resource items (e.g., oil filter, etc.) to be used for the first service may be added to the source hierarchical data 124 in the third highest level and parent identifications indicating the second entity identification of the first service may be associated therewith to establish parent-child relationships between the other resource items and the first service.

By way of non-limiting example, the source hierarchical data 124 may have, in the past, been stored to several different source destination hierarchical databases 102 and it may be desirable to transition, over time, the source hierarchical data 124 to a new, single, more modern destination hierarchical database 104 as destination hierarchical data 126. During a transition period, appointment data may be added to, changed, and/or deleted from the source hierarchical data 124 (e.g., using the one or more clients 128) and these changes may be pushed to the destination hierarchical data 126 by the change data capture software application 118, the data pipeline 120, and the synchronization client software application 122. In some embodiments, the change data capture software application 118, the data pipeline 120, and the synchronization client software application 122 may be used to keep the destination hierarchical data 126 synchronized with the source hierarchical data 124 to maintain redundant databases in case data is destroyed in one of the databases. In any case, the change data capture software application 118 is configured to detect a change to the source hierarchical data 124 (e.g., a change made by the one or more clients 128) and generate the one or more messages 132 responsive to the detected change.

In some embodiments, objects of the one or more messages 132 may include changed versions of the sub-portions of the source hierarchical data 124 to update the destination hierarchical data 126 with the changed versions of the sub-portions of the source hierarchical data 124. In some embodiments, the objects of the one or more messages 132 include created timestamps indicating creation times for the sub-portions of the source hierarchical data 124. In some embodiments, the objects of the one or more messages 132 include modification timestamps indicating modification times for the sub-portions of the source hierarchical data 124.

The data change operations may indicate what type of change should be made for a given object in a message 132. For example, the objects include data change operations indicating whether the detected change to the source hierarchical data 124 was a creation of new data, an update to existing data, or a deletion of the existing data.

In some instances, a message 132 for an object from a lower level in the hierarchy may arrive at the synchronization client software application 122 prior to a message 132 for a parent object from a higher level in the hierarchy. By way of non-limiting example, the message 132 from the lower level may include a create data change operation indicating that the corresponding data should be created in the destination hierarchical data 126. If this message 132 arrives prior to a message 132 for the parent object, a sub-portion of the destination hierarchical data 126 corresponding to the parent object may not yet exist in the one or more destination hierarchical databases 104. Accordingly, the synchronization client software application 122 may be configured to temporarily store (e.g., mark as pending) those of the received objects having parent identifications that do not correspond to existing entity identifications in the destination hierarchical data. The synchronization client software application 122 may also be configured to move those of the objects that are temporarily stored to the one or more destination hierarchical databases 104 responsive to reception of the parent objects (i.e., objects including entity identifications matching the parent identifications of the temporarily stored objects).

Figure 2:
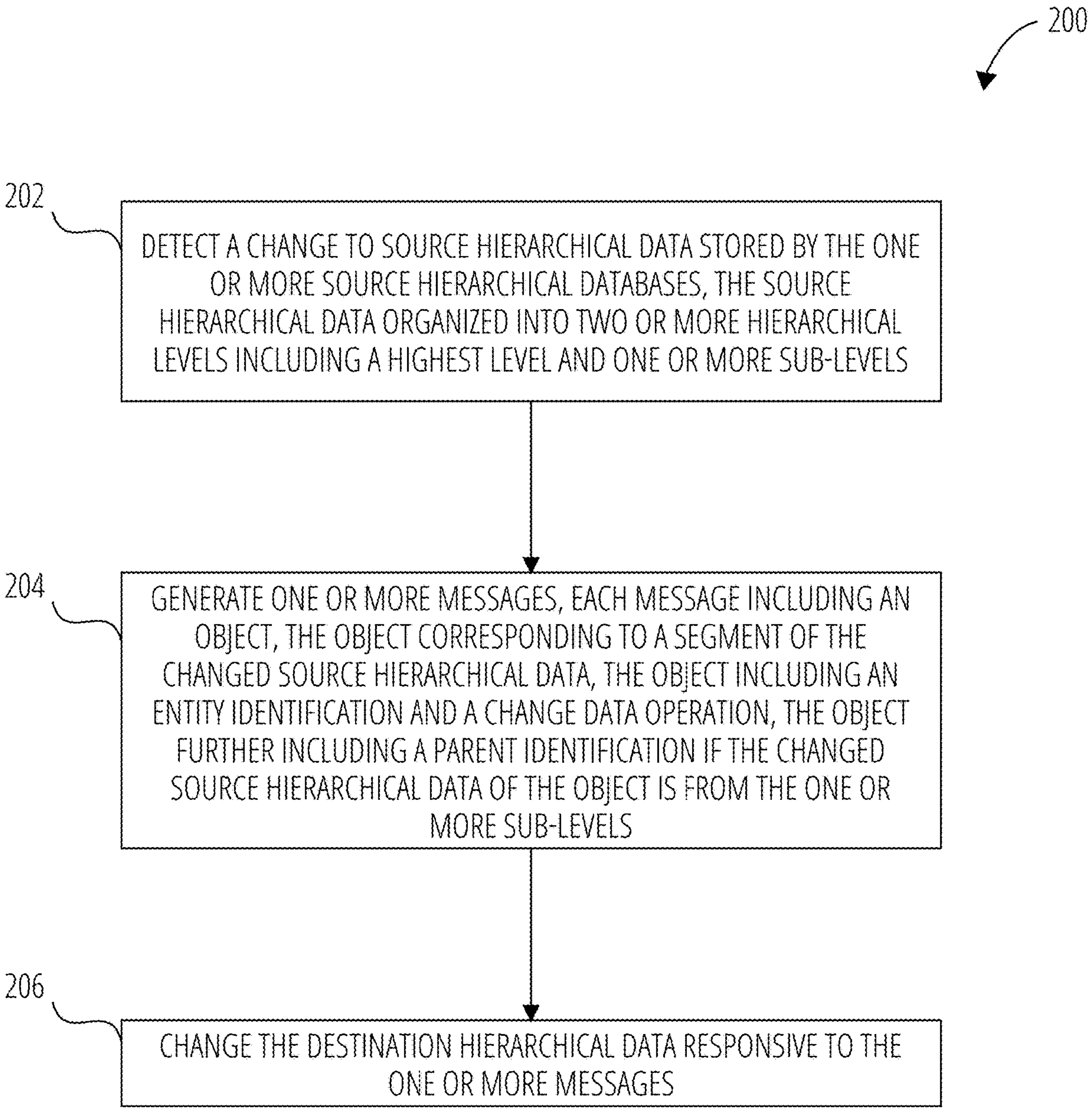
FIG. 2 is a flowchart illustrating a method of synchronizing one or more destination hierarchical databases to one or more source hierarchical databases, according to some embodiments.

FIG. 2 is a flowchart illustrating a method 200 of synchronizing one or more destination hierarchical databases (e.g., the one or more destination hierarchical databases 104 of FIG. 1) to one or more source hierarchical databases (e.g., the one or more source hierarchical databases 102 of FIG. 1), according to some embodiments. At operation 202, the method 200 includes detecting a change to source hierarchical data (e.g., the source hierarchical data 124 of FIG. 1) stored by the one or more source hierarchical databases. The source hierarchical data is organized into two or more hierarchical levels including a highest level and one or more sub-levels.

At operation 204, the method 200 includes generating one or more messages (e.g., the one or more messages 132 of FIG. 1). Each message includes an object. The object corresponds to a segment of the changed source hierarchical data. The object includes an entity identification and a change data operation (e.g., create, update, delete). The object further includes a parent identification if the changed source hierarchical data of the object is from the one or more sub-levels. In some embodiments, an object may be serialized in a textual representation (e.g., Java Script Object Notation (JSON) or other formats). In some embodiments, an object may be serialized in binary format. Examples of ways the object may be serialized may include XML, Google ProtoBuf, or Apache Avro. The object may include before and/or after change data corresponding to the specific data element values before and after the operation. In some instances, before and/or after data may be excluded from the message if it is not relevant to processing. For example, in the case of a create operation, before data may not be provided; in the case of a delete operation, after data may not be provided; in the case of an update operation, both before data and after data may be provided.

At operation 206, the method 200 includes changing the destination hierarchical data responsive to the one or more messages. Some examples of methods that may be used to change the destination hierarchical data responsive to the one or more messages according to operation 206 are discussed with reference to FIG. 3A, FIG. 3B, and FIG. 3C.

In some embodiments, generating the one or more messages (operation 204) includes generating a message wherein the object of the message includes a create change data operation and a parent identification. In some such embodiments, changing the destination hierarchical data responsive to the one or more messages (operation 206) includes marking the object as pending responsive to determinations that the parent identification is not yet included as an existing entity identification in the destination hierarchical database.

In some embodiments, generating the one or more messages (operation 204) includes generating a message wherein the object of the message includes a create change data operation but the object does not include a parent identification (e.g., the object corresponds to a segment of the source hierarchical data that is in the highest level). In some such embodiments, changing the destination hierarchical data responsive to the one or more messages (operation 206) includes storing the segment of the changed source hierarchical data to the destination hierarchical database responsive to a determination that the entity identification of the object is not already included as an existing entity identification in the destination hierarchical database.

In some embodiments, generating the one or more messages (operation 204) includes generating a message wherein the object of the message includes a create change data operation. In some such embodiments, changing the destination hierarchical data responsive to the one or more messages (operation 206) includes stopping processing of the object responsive to a determination that the entity identification of the object is already included as an existing entity identification in the destination hierarchical database.

In some embodiments, generating the one or more messages (operation 204) includes generating a message wherein the object of the message includes an update change data operation. In some such embodiments, changing the destination hierarchical data responsive to the one or more messages (operation 206) includes processing the object as a create change data operation responsive to a determination that the entity identification of the object is not already included as an existing entity identification in the destination hierarchical database.

In some embodiments, generating the one or more messages (operation 204) includes generating a message wherein the object of the message includes an update change data operation. In some such embodiments, changing the destination hierarchical data responsive to the one or more messages (operation 206) includes updating the destination hierarchical data with the segment of the changed source hierarchical data corresponding to the object responsive to determinations that the update is not trivial, a corresponding update timestamp is present in the destination hierarchical database, and the corresponding update timestamp is earlier than an update timestamp of the message.

In some embodiments, generating the one or more messages (operation 204) includes generating a message wherein the object of the message includes a delete change data operation. In some embodiments, changing the destination hierarchical data responsive to the one or more messages (operation 206) includes deleting a segment of the destination hierarchical data that corresponds to the segment of changed source hierarchical data responsive to determinations that the entity identification of the object already exists as an existing entity identification in the destination hierarchical database and a modification timestamp of the object is earlier than an existing modification timestamp of the segment of the destination hierarchical data.

Figure 3A:
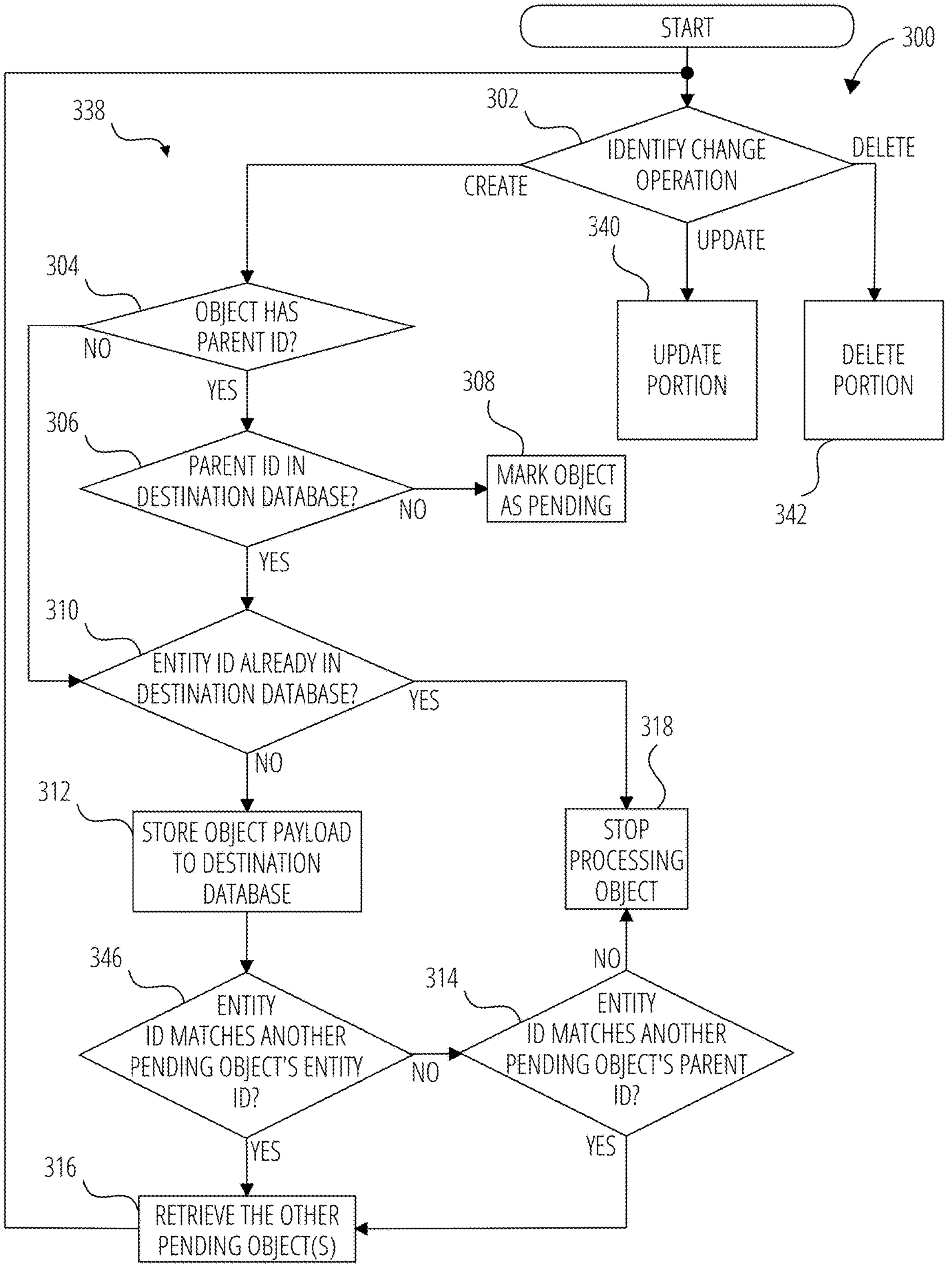
FIG. 3A, FIG. 3B, and FIG. 3C are a flowchart illustrating an example of a method of changing destination hierarchical data responsive to one or more messages.
Figure 3B:
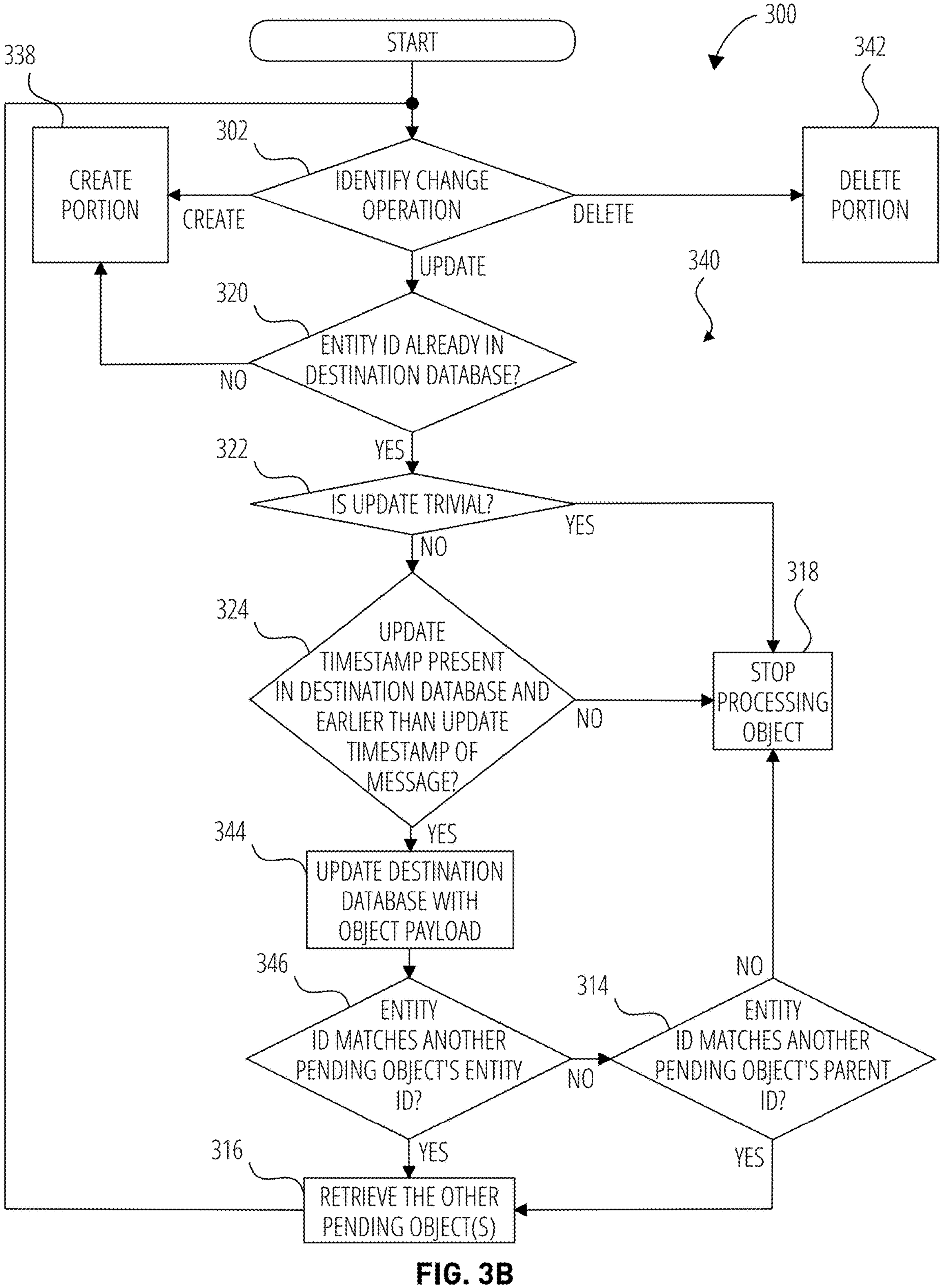
Figure 3C:
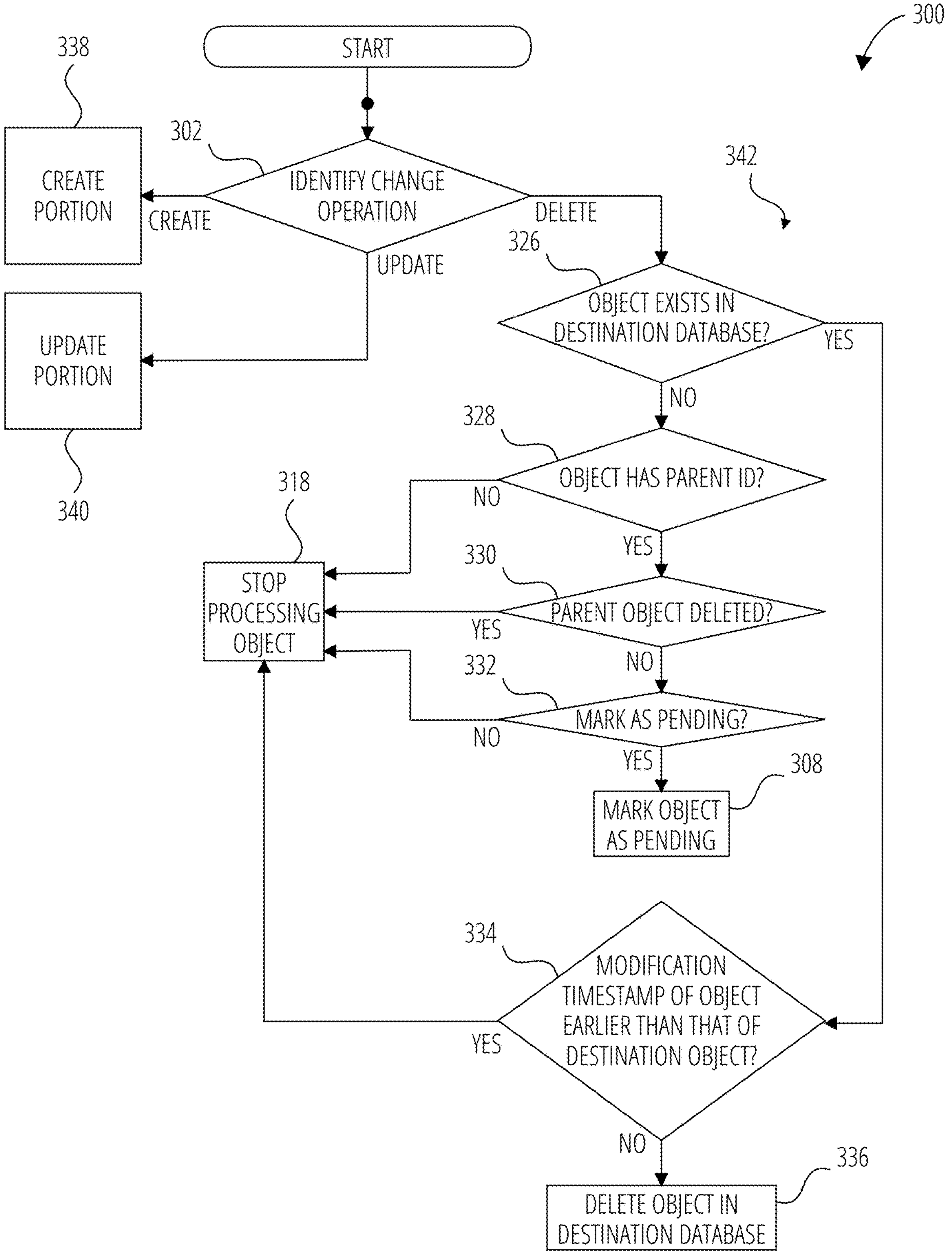

FIG. 3A, FIG. 3B, and FIG. 3C are a flowchart illustrating an example of a method 300 of changing destination hierarchical data (e.g., the destination hierarchical data 126 stored in the one or more destination hierarchical databases 104 of FIG. 1) responsive to one or more messages (e.g., the one or more messages 132 of FIG. 1). The method 300 may be performed by synchronization client software application 122 of FIG. 1. FIG. 3A is a create portion 338 of the method 300.

FIG. 3B is an update portion 340 of the method 300.

FIG. 3C is a delete portion 342 of the method 300. The create portion 338, the update portion 340, and the delete portion 342 correspond to a create change operation, an update change operation, and a delete change operation, respectively, indicated by an object of a received message.

Referring to FIG. 3A, FIG. 3B, and FIG. 3C together, the method 300 starts at decision 302, which includes identifying a change operation indicated by an object provided by a received message. If the change operation indicated by the object is a create change operation, the method 300 proceeds to decision 304 of the create portion 338. If the change operation indicated by the object is an update change operation, the method 300 proceeds to operation 320 of the update portion 340. If the change operation indicated by the object is a delete change operation, the method 300 proceeds to decision 326 of delete portion 342.

Referring to FIG. 3A, responsive to a determination at decision 302 that the change operation is a create change operation, at decision 304, the method 300 includes determining whether the object has a parent identification associated therewith. If the object is from the highest hierarchical level, no parent identification will be associated therewith. If, however, the object is from the one or more sub-levels, the object will have a parent identification associated therewith. If it is determined at decision 304 that the object has a parent identification associated therewith, at decision 306, the method 300 includes determining whether parent identification already exists for an object stored in the destination hierarchical database. If it is determined at decision 306 that the parent identification does not already exist for an object stored in the destination hierarchical database, at operation 308 the method 300 includes marking the object as pending. The object may be temporarily stored until another object including an entity identification that matches the parent identification of the temporarily stored object is processed (e.g., using the method 300). If, however, it is determined at decision 306 that the parent identification does already exist in the destination database, the method 300 proceeds to decision 310. Also, if it is determined at decision 304 that the object does not have a parent identification, the method 300 proceeds to decision 310.

At decision 310, the method 300 includes determining whether the entity identification of the object already exists in the database. If the entity identification of the object already exists, then the subset of the source hierarchical data associated with the object has already been created in the destination hierarchical database. Accordingly, at operation 318, the method 300 includes stopping processing of the object. If, however, it is determined at decision 310 that the entity identification does not already exist in the destination hierarchical database, the method 300 proceeds to operation 312. At operation 312, the method 300 includes storing the object payload (e.g., the subset of the source hierarchical data associated with the object) to the destination hierarchical database.

In some instances, an object (e.g., a single object) stored at the destination hierarchical database may correspond to the objects (e.g., appointment service jobs) of multiple messages, and may impose an ordering on the processing of those objects. In some instances, these objects may be marked as pending if received outside of the imposed ordering. Accordingly, at decision 346, the method 300 may include determining whether the entity identification matches another pending object's entity identification. If it is determined that the entity identification matches another pending object's entity identification, the method 300 includes retrieving the other pending object(s) having the matching entity identification at operation 316 and processing them starting with decision 302.

As discussed above, asynchronous arrival of objects that include data organized into a hierarchy may sometimes result in data arriving at the synchronization client software application 122 in an order that is not conducive to storing the data into the destination hierarchical database in proper adherence to the hierarchy. As a result, the method 300 may result in objects being marked as pending (e.g., as in operation 308) and temporarily stored until other objects having entity identifications matching parent identifications of the pending objects are received and processed. Accordingly, returning to decision 346, if it is determined that the entity identification does not match another pending object's entity identification, the method 300 proceeds to decision 314. At decision 314, the method 300 includes determining whether the entity identification of the object matches another pending object's parent identification. If the entity identification does not match any other pending object's parent identification, the method 300 may proceed to operation 318, which includes stopping processing of the object. If, however, the entity identification matches one or more other pending objects'parent identification, the method 300 may proceed to operation 316, which includes retrieving the other pending object(s) having the matching parent identifications, and processing them starting with decision 302.

Referring now to FIG. 3B, if it is determined at decision 302 that the change operation of the object is an update change operation, the method 300 proceeds to update portion 340 and operation 320. At operation 320, the method 300 includes determining whether the entity identification of the object is already in the destination hierarchical database as associated with existing data of the destination hierarchical data. If it is determined that the entity identification does not already exist in the destination hierarchical database, there is not data that may be updated using the object and the method 300 proceeds to create portion 338 to process the object as a create change operation object. If, however, it is determined that the entity identification does already exist in the destination hierarchical database, the method 300 remains in update portion 340 and proceeds to decision 322.

At decision 322, the method 300 includes determining whether the update is trivial. The criteria that determines whether or not an update is trivial may be created on a case-by-case scenario to meet specific business objectives. For example, a trivial update may be an update in which data in the update operation object matches before and after the update in the source hierarchical database for all fields that are relevant to the destination database. As a specific, non-limiting example, inf the only change is an update to a modification timestamp, with no other changes to data in the source hierarchical database, the update may be deemed trivial. As another example, the source hierarchical databases may be general vehicle dealership databases and the destination hierarchical databases may be more narrowly directed to appointment databases. In this example, objects corresponding to information from the source hierarchical databases that is not specifically relevant to appointments may be determined to be trivial. If it is determined that the update is trivial, the method 300 may proceed to operation 318, which includes stopping processing of the object. If, however, it is determined that the update is not trivial, the method 300 proceeds to decision 324.

At decision 324, the method 300 includes determining whether an existing update timestamp present for a corresponding object in the destination hierarchical databases is earlier than an update timestamp of the message. If the existing update timestamp present for the corresponding object in the destination hierarchical databases is not earlier than the update timestamp of the message, the corresponding existing data in the destination hierarchical database is as up to date or more up to date than the data of the current update object. Accordingly, responsive to a determination at decision 324 that the existing update timestamp present for the corresponding object in the destination hierarchical databases is not earlier than the update timestamp of the message, the method 300 proceeds to operation 318, which includes stopping processing of the object. If, however, it is determined at decision 324 that the existing update timestamp present for the corresponding object in the destination hierarchical databases is earlier than the update timestamp of the message, the method 300 proceeds to operation 344, which includes updating the destination database with the object payload.

At decision 346, the method 300 may include determining whether the entity identification matches another pending object's entity identification. If it is determined that the entity identification matches another pending object's entity identification, the method 300 includes retrieving the other pending object(s) having the matching entity identification at operation 316 and processing them starting with decision 302, If it is determined at decision 346 that the entity identification does not match another pending object's entity identification, the method 300 proceeds to decision 314, which includes determining whether the entity identification of the current object matches another pending object's parent identification. If the entity identification of the current object does not match another pending object's parent identification, the method 300 includes stopping processing of the object at operation 318. If, however, it is determined that the entity identification of the current object matches another pending object's parent identification, at operation 316 the method 300 includes retrieving the other pending object(s) for processing according to the method 300, starting with decision 302.

Referring now to FIG. 3C, if it is determined at decision 302 that the change operation of the object is a delete change operation, the method 300 proceeds to decision 324 of the delete portion 342. At decision 324, the method 300 includes determining whether an existing object corresponding to the current object in the message exists in the destination hierarchical database. If it is determined at decision 326 that the object exists in the destination hierarchical database, the method 300 proceeds to decision 334, which includes determining whether a modification timestamp of the object is earlier than that of the corresponding existing object in the destination hierarchical database. If it is determined that the modification timestamp of the current object is not earlier than that of the destination object, the corresponding object in the destination database is deleted at operation 336. In some embodiments, deletion of an object may include a "hard delete" (e.g., where the data is physically deleted from the destination hierarchical database. In some embodiments, deletion of an object may include a "soft delete" (e.g., where data is marked as deleted but not physically removed). If, on the other hand, it is determined at decision 334 that the modification timestamp of the current object is earlier than that of the destination object, at decision block 334, the method 300 proceeds to operation 318, which includes stopping processing of the object.

Returning to decision 326, if it is determined that a corresponding object does not exist in the destination hierarchical database, the method 300 proceeds to decision 328. At decision 328, the method 300 includes determining whether the object includes a parent identification. If the object does not include a parent identification, the method 300 includes stopping processing of the object at operation 318. If, however, it is determined at decision 328 that the object includes a parent identification, the method 300 proceeds to decision 330.

At decision 330, the method 300 includes determining whether a parent object having the entity identification matching the parent identification of the current object has been deleted from the destination hierarchical database (e.g., by checking a processing log stored in the destination hierarchical database or in a persistent storage medium accessible to the sync client). If it is determined at decision 330 that the parent object has been deleted, the method 300 includes stopping processing of the object at operation 318. If, however, it is determined at decision 330 that the parent object has not been deleted from the destination hierarchical database, the method 300 proceeds to decision 332.

At decision 332, the method 300 includes determining whether the object should be marked as pending. The determination at decision 332 may be based on specific business logic. If it is determined that the object should be marked as pending, the method 300 proceeds to operation 308, which includes marking the object as pending. This allows the message/object to be reprocessed later if a message/object related to this object or its parent identification arrives in the future (e.g., at decision 314 of FIG. 3A and FIG. 3B). If, on the other hand, at operation decision 332 it is determined that the object should not be marked as pending, at operation 318, the method 300 includes stopping processing of the object.

In some embodiments, metadata may be produced (e.g., by the data pipeline 120, the change data capture software application 118, and/or the synchronization client software application 122) when processing messages (e.g., message 132 of FIG. 1). As messages are processed, synchronization metadata, such as the processing status of the message (e.g., success, failure, skipped, pending further information) and timing information related to processing duration of messages, along with informational messages that provide more context as to why a message ended in a non-success status are pushed into an external observability/monitoring system so that the status of the system may be viewed through dashboards and monitored.

In some embodiments, the computing system (e.g., the computing system 100 of FIG. 1) may assist in handling dual-writes, which may include writing the same information in rapid succession to the source hierarchical databases, then to the destination hierarchical databases from an external system (e.g., external to the computing system 100 of FIG. 1). A synchronization code may account for writes in the destination hierarchical databases. These writes may happen after the writes to the source hierarchical databases. The writes to the destination hierarchical databases do not overwrite more recent destination hierarchical data with older source hierarchical data (e.g., according to timestamps of the data in the destination hierarchical databases and timestamps of the objects of the messages). Accordingly, in addition to ordering events (e.g., messages) received asynchronously from the messaging topics, the computing system 100 also verifies that the data being written into the destination hierarchical databases is more recent than the data that is already present in the destination hierarchical databases (e.g., using timestamps).

By way of non-limiting example, appointment data may be saved via user interaction with a graphical user interface at a client of the one or more clients 128 (FIG. 1) with dual-write enabled. Referring again to FIG. 1, a system (e.g., outside the computing system 100) writes the appointment into the one or more source hierarchical databases 102 (e.g., a legacy appointment database) and to the one or more destination hierarchical databases 104 (e.g., a modern appointment database) in succession. The change data capture software application 118 observes the change in the one or more source hierarchical databases 102 and creates messages 132 in the topics to be consumed by the synchronization client software application 122 for the changed records.

The synchronization client software application 122 receives the messages 132 from the topics and begins to process the message 132 in the correct order (e.g., according to the method 300 of FIG. 3A, FIG. 3B, and FIG. 3C). At the point that the messages may be properly created, updated or deleted in the one or more destination hierarchical databases 104, the synchronization client software application 122 compares how recent the destination hierarchical data 126 (if any) is to the synchronized data to ensure that only the most recent data is preserved in the one or more destination hierarchical databases 104. The synchronization client software application 122 may decide, per record, whether to process the message 132 or skip the processing if the timestamp of the existing data in the one or more source hierarchical databases 102 is later than the timestamp of the record in the message 132.

Figure 4:
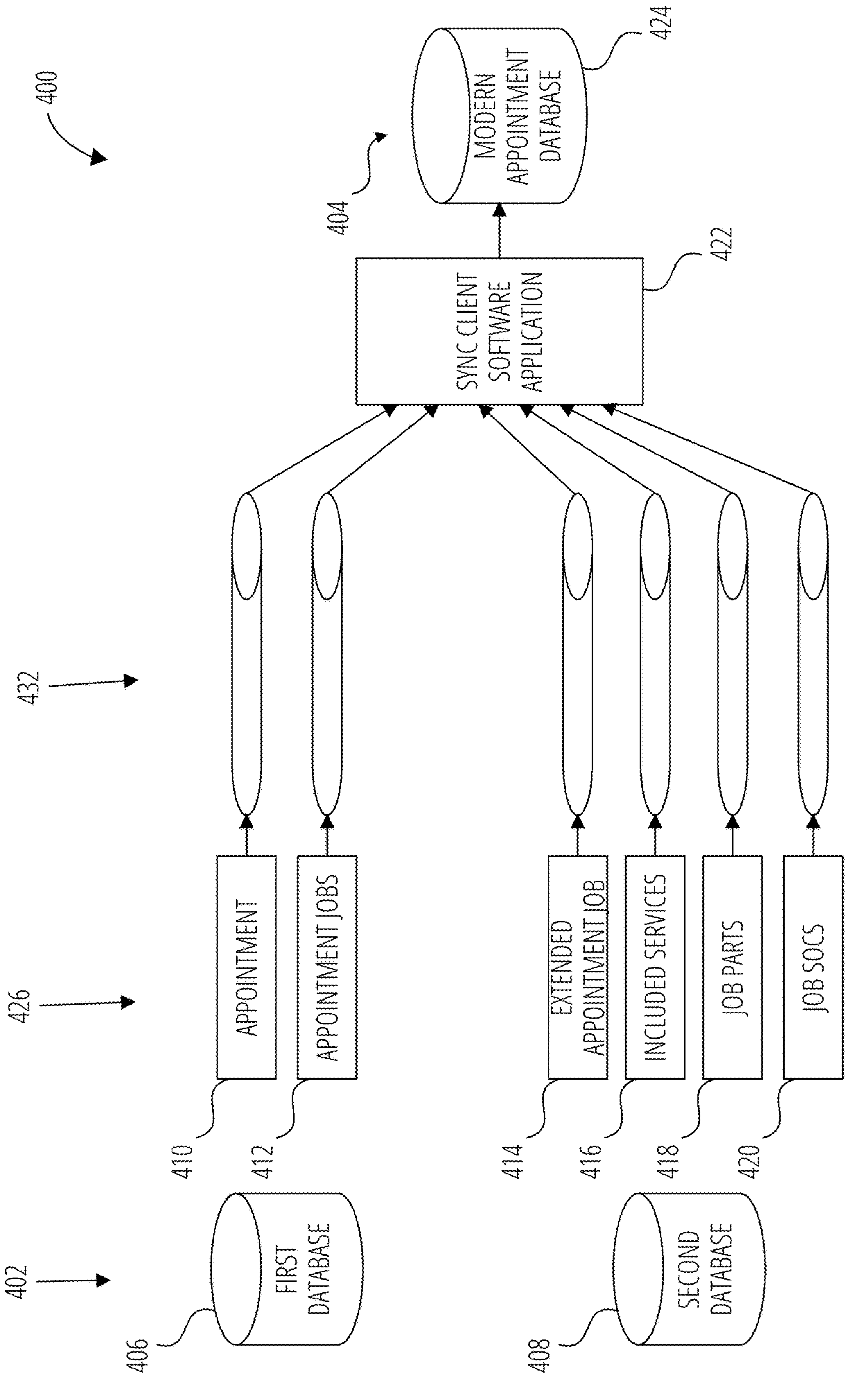
FIG. 4 is a block diagram of an example appointment domain that may be implemented by the computing system of FIG. 1.

FIG. 4 is a block diagram of an example appointment domain 400 that may be implemented by the computing system 100 of FIG. 1. The example appointment domain 400 includes source hierarchical databases 402, a synchronization client software application 422, and a destination hierarchical database 404 similar to the one or more source hierarchical databases 102, the synchronization client software application 122, and the one or more destination hierarchical databases 104 discussed with reference to FIG. 1. The source hierarchical databases 402 includes a first database 406 and a second database 408. By way of non-limiting example, the second database 408 may store additional appointment information. The destination hierarchical database 404 includes a modern appointment database 424.

In the example of FIG. 4, the source hierarchical databases 402 may include a legacy database system and at least a portion of source hierarchical data 426 stored thereby is transferred to the modern appointment database 424. As a result, FIG. 4 may illustrate a scenario of the computing system 100 of FIG. 1 for moving hierarchical data in an asynchronous manner from a legacy database to a more modern database system. The source hierarchical databases 402 and the destination hierarchical database 404 may persist together for a transitionary period of time. Accordingly, the destination hierarchical database 404 may be synchronized to the source hierarchical databases 402.

The source hierarchical data 426 includes an appointment 410 and appointment jobs 412 stored on the first database 406 and extended appointment job 414, included services 416, job parts 418, and job special operating conditions 420 (SOCs 420) stored on the second database 408. This source hierarchical data 426 may be stored in the source hierarchical databases 402 according to a hierarchy, as will be discussed with reference to FIG. 5. The appointment 410 may include information identifying a customer, a vehicle, and appointment date and time. The appointment jobs 412 include actual service jobs (e.g., oil change, timing belt replacement, brake pad replacement, etc.) to be performed at the appointment 410. The extended appointment job 414 may include similar information to that discussed for the appointment jobs 412, except that the information for the appointment jobs 412 may be distributed among different objects in different databases (e.g., as the appointment jobs

412 of first database 406 and the extended appointment job 414 of second database 408). In the example illustrated in FIG. 4, there are multiple appointment jobs 412 and one extended appointment job 414.

The included services 416 may include extra services that are included in a service defined for the appointment jobs 412 and/or the extended appointment job 414. By way of non-limiting example, if the appointment 410 or the extended appointment job 414 include a service job for an oil change, the included services 416 may include the actual changing of the oil, oil filter change, cabin air filter change, and topping off of other fluids (e.g., washer fluid, coolant, etc.). The job parts 418 may include parts used to perform the corresponding appointment jobs 412 and extended appointment job 414 (e.g., oil, filters, fluids, spark plugs, hardware, body panels, batteries, tires, etc.). The job SOCs 420 may include information indicating any special operating conditions that may inform specific courses of action in handling a vehicle scheduled for the appointment jobs 412 and the extended appointment job 414 in the appointment 410. By way of non-limiting example, one of the job SOCs 420 may include indicating that the vehicle is frequently operated in dusty conditions. Where the appointment jobs 412 and/or the extended appointment job 414 include a service for a brake pad replacement, this job SOC 420 indicating that the vehicle is frequently operated in dusty conditions may inform the technician performing the brake pad replacement that extra cleaning may be required to perform the brake pad change and/or that extra wear and tear due to frequent dust may be present.

This source hierarchical data 426 (e.g., the appointment 410, the appointment jobs 412, the extended appointment job 414, the included services 416, the job parts 418, and the job SOCs 420) may be pushed as messages 432 to a data pipeline (e.g., the data pipeline 120 of FIG. 1) by a data change data capture software application (e.g., the change data capture software application 118 of FIG. 1). The synchronization client software application 422 may subscribe to the channels of the data pipeline that the messages 432 are pushed to. The synchronization client software application 422 may also process the messages 432 (e.g., using the method 300 of FIG. 3A, FIG. 3B, and FIG. 3C) to store the appointment 410, the appointment jobs 412, the extended appointment job 414, the included services 416, the job parts 418, and the job SOCs 420 to the modern appointment database 424 according to a hierarchy (e.g., according to the same hierarchy as that of the source hierarchical databases 402, which is illustrated in FIG. 5).

Figure 5:
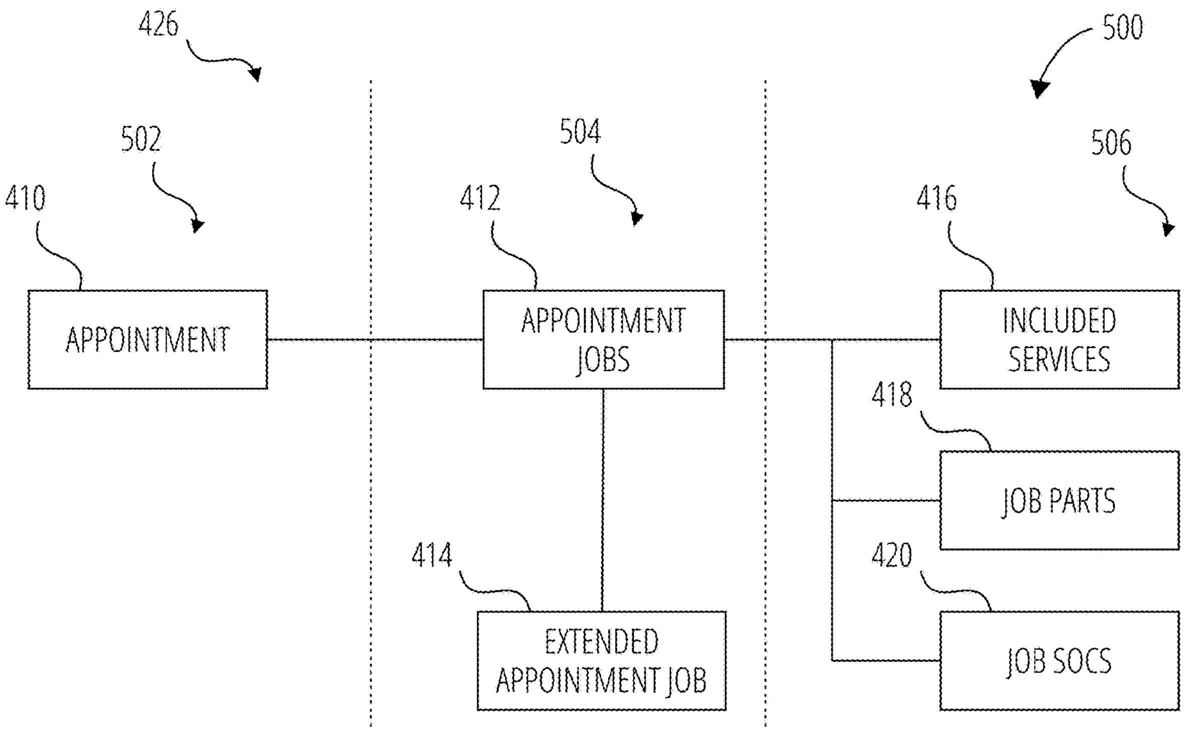
FIG. 5 is a block diagram illustrating an example of a simplified logical source database schema for source hierarchical data of a source hierarchical databases of the example appointment domain of FIG. 4.

FIG. 5 is a block diagram illustrating an example of a simplified logical source database schema 500 for the source hierarchical data 426 of the source hierarchical databases 402 of the example appointment domain 400 of FIG. 4. The components of the source hierarchical data 426, including the appointment 410, the appointment jobs 412, the extended appointment job 414, the included services 416, the job parts 418, and the job SOCs 420 are illustrated in a hierarchy. For example, the source hierarchical data 426 is organized into a highest level 502, a second highest level 504, and a third highest level 506. The appointment 410 and is included in the highest level 502; the appointment jobs 412 and the extended appointment job 414 are included in the second highest level 504; and the included services 416, the job parts 418, and the job SOCs 420 are included in the third highest level 506.

Each object of the appointment 410, the appointment jobs 412, the extended appointment job 414, the included services 416, the job parts 418, and the job SOCs 420 includes an entity identification associated therewith. The object of the appointment 410 would not have a parent identification associated therewith because it is within the highest level 502. The objects for the appointment jobs 412, the extended appointment job 414, the included services 416, the job parts 418, and the job SOCs 420, however, would include parent identifications to indicate the entity identification of the object that has a parent relationship therewith. For example, objects associated with the appointment jobs 412 and the extended appointment job 414 would include a parent identification that matches the entity identification of the object of the appointment 410 to indicate that the object of the appointment has a parental relationship to the objects of the appointment jobs 412 and the extended appointment job 414. Objects of the appointment jobs 412 may be associated with the object of the extended appointment job 414, if desired, using a common key to join the objects together. Also, the objects of included services 416, the job parts 418, and the job SOCs 420 have parent identifications indicating the entity identification of the object of the appointment jobs 412 that has the parent relationship therewith.

In some instances, data corresponding to objects of some of the items of the source hierarchical data 426 may be changed. A change data capture software application (e.g., the change data capture software application 118 of FIG. 1) may detect the changes, and push messages (e.g., some of the messages 432 of FIG. 4) to the synchronization client (e.g., the synchronization client software application 422 of FIG. 4) to make corresponding changes to the destination hierarchical database (e.g., the destination hierarchical database 404). Messages corresponding to the objects may arrive at the synchronization client software application in any order. The synchronization client software application may synchronize the destination hierarchical database to the source hierarchical database regardless of an order of receipt of the messages according to various embodiments disclosed herein.

Figure 6:
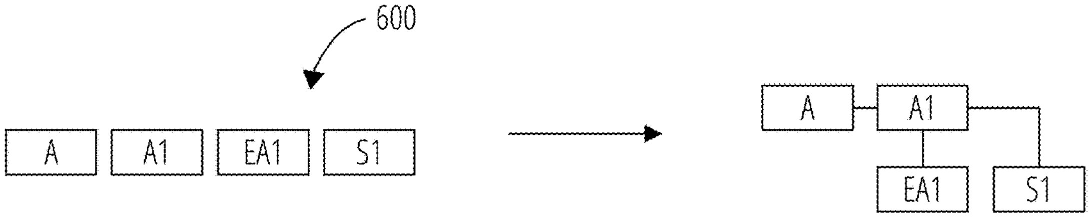
FIG. 6 illustrates an example of a hierarchy conforming order of objects according to the hierarchy discussed for the logical source database schema of FIG. 5.

FIG. 6 illustrates an example of a hierarchy conforming order of objects 600 according to the hierarchy discussed for the logical source database schema 500 of FIG. 5. As illustrated in FIG. 6, objects for an appointment (A) (e.g., the appointment 410 of FIG. 4 and FIG. 5), a single appointment job (A1) (e.g., one of the appointment jobs 412 of FIG. 4 and FIG. 5), a single extended appointment job (EA1) (e.g., the extended appointment job 414 of FIG. 4 and FIG. 5), and a single included service (S1) (e.g., one of the included services 416 of FIG. 4 and FIG. 5) may be pushed (e.g., as messages 432 of FIG. 4) to a synchronization client software application (e.g., the synchronization client software application 422 of FIG. 4) responsive to changes being made (e.g., by the one or more clients 128 of FIG. 1) to the source hierarchical data (e.g., the source hierarchical data 426 of FIG. 4).

Figure 7:
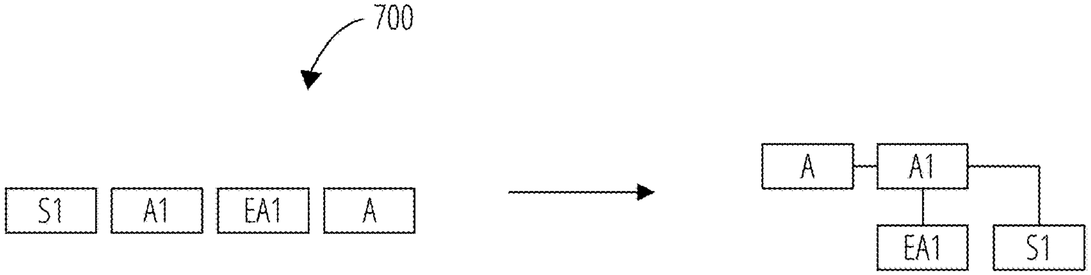
FIG. 7 illustrates an example of a hierarchy non-conforming order of objects according to the hierarchy discussed for the logical source database schema of FIG. 5.

In order to conform to the order, it would be helpful if these messages arrived in the order shown in FIG. 6, with object A arriving first, object A1 arriving second, object EA1 arriving third, and object S1 arriving fourth. This would allow manipulation of a corresponding appointment for A in the destination hierarchical database (e.g., the destination hierarchical database 404 of FIG. 4), followed by manipulations for objects A1 and EA1, which are children of object A, and further followed by the object S1, which is a child of object A1. FIG. 7 considers a case in which the objects A, A1, EA1, and S1 arrive at the synchronization client software application in a different order. In this example, since there are four different objects there are four factorial (4!) possible orders of arrival of the messages.

FIG. 7 illustrates an example of a hierarchy non-conforming order of objects 700 according to the hierarchy discussed for the logical source database schema 500 of FIG. 5. In contrast to the hierarchy conforming order of objects 600 of FIG. 6, the objects A, A1, EA1, and S1 arrive in a different order, specifically S1 first, A1 second, EA1 third, and A last. Since the highest level object A is received last, the synchronization client software application (e.g., the synchronization client software application 422 of FIG. 4) marks the objects for S1, A1, and EA1 as pending (e.g., at operation 308 of FIG. 3A, FIG. 3B, and FIG. 3C) and temporarily stores the objects for S1, A1, and EA1 until the parent object A from the highest level (e.g., the highest level 502) of the hierarchy arrives. The synchronization client software application modifies the records in the destination hierarchical database in an order that does not violate foreign key constraints (e.g., an appointment job may not be inserted without the corresponding appointment and should handle deletions of parents and children or concurrent updates in a logically consistent manner).

After parent object A arrives, the synchronization client software application makes adjustments (e.g., create, update, delete) to the destination hierarchical database (e.g., the destination hierarchical database 404 of FIG. 4) based on object A. Then, the synchronization client software application processes objects A1 and EA1, which indicate the entity identification of object A as their parent identifications (see decision 314 and operation 316 of FIG. 3A and FIG. 3B), to make adjustments to the destination hierarchical database based on objects A1 and EA1. Finally, the synchronization client software application processes object S1, which indicates the entity identification of object A1 as its parent identification, to make adjustments to the destination hierarchical database based on object S1.

Figure 8:
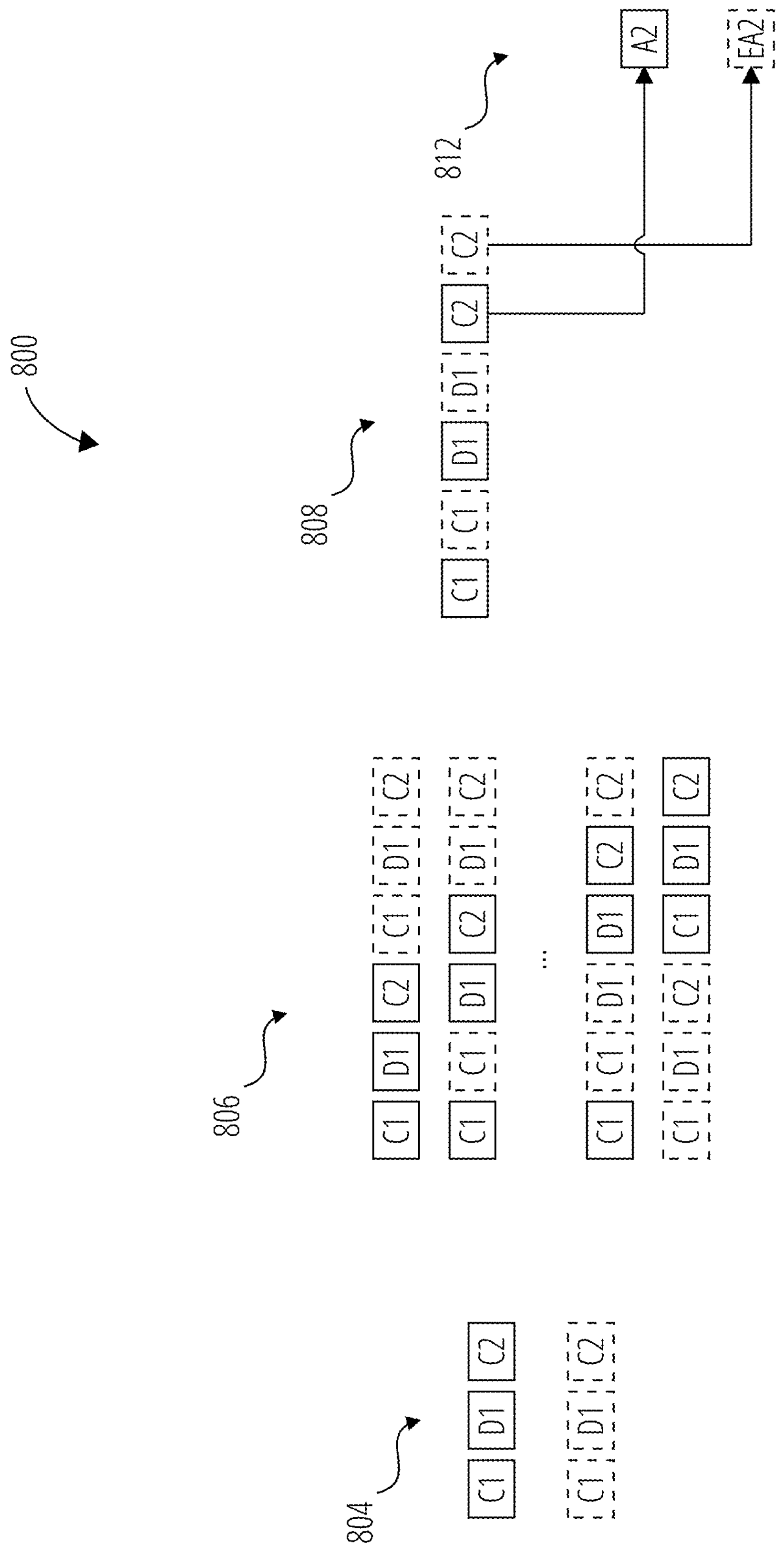
FIG. 8 illustrates another example appointment domain.

FIG. 8 illustrates another example appointment domain 800. The example appointment domain 800 illustrates source objects 804 from source hierarchical databases (e.g., the one or more source hierarchical databases 102 of FIG. 1 or the source hierarchical databases 402 of FIG. 4) and destination objects 812 at a destination hierarchical database (e.g., the one or more destination hierarchical databases 104 of FIG. 1 or the destination hierarchical database 404 of FIG. 4) to be adjusted based on the source objects 804. The example appointment domain 800 also illustrates various possible arrival orders 806 of the source objects 804 at a synchronization client software application (e.g., the synchronization client software application 422 of FIG. 4 or the synchronization client software application 122 of FIG. 1). The example appointment domain 800 further illustrates a correct data processing order 808 to make adjustments to the destination objects 812.

The synchronization client software application includes logic to account for the structure in the source hierarchical databases for appointment jobs (e.g., the appointment jobs 412 of FIG. 4 and FIG. 5) and extended appointment jobs (e.g., the extended appointment job 414 of FIG. 4 and FIG. 5). For example, data for a single object may be represented in the source hierarchical databases in two tables (e.g., in separate databases or in a common database) that are joined by a common key. When updates are made to these objects in the source hierarchical database, the existing objects are deleted then recreated with the same key resulting in pairs of updates. In the example illustrated in FIG. 8, the pairs of updates may be represented by C1, D1, and C2 from one table (shown with solid lines in FIG. 8) and C1, D1, and C2 from another table (shown in broken lines). The updates C1, D1, and C2 from the first table (shown in solid lines) may correspond to an appointment job A2 of the destination objects 812 in the destination hierarchical database. The updates C1, D1, and C2 from the second table (shown in broken lines) may correspond to an extended appointment job EA2 of the destination objects 812 in the destination hierarchical database.

In the destination hierarchical database, both the appointment job A2 and the extended appointment job EA2 records are merged into a single table. Depending on how create, delete, and update messages (e.g., the messages 132 of FIG. 1 or the messages 432 of FIG. 4) are processed from a single table, the destination database could be left with correct data, orphaned data, partial data from one table or the other, or no data. The synchronization client software application of the example appointment domain 800 includes logic to handle all possible orderings and ensure that the final data represents the correct state.

The correct data processing order 808 in the example appointment domain 800 is C1 (first table, solid lines), C1 (second table, broken lines), D1 (first table, solid lines), D1 (second table, broken lines), C2 (first table, solid lines), and finally C2 (second table, broken lines). In some embodiments, the source objects 804 from a given table may arrive at the synchronization client software application in a correct processing order. For example, those of the source objects 804 from the first table may arrive at the synchronization client software application in the order starting with C1, then D1, and then C2. Similarly, those of the source objects 804 from the second table may arrive at the synchronization client software application in the order starting with C1, then D1, and then C2. But objects from the first source table and the second source table may intermix in their arrival order. Accordingly, as illustrated in FIG. 8, the possible arrival orders 806 may include various different possible orders of arrival of the source objects 804, even assuming that the objects from each table arrive in the correct order. By way of non-limiting example, for 2 topics (source tables), each with k elements, there are C(2k, k) possible orderings, where C(2k, k)=2k!/(k!k!). This is the standard binomial coefficient with n=2k. For k=2, 3, and 4 the number of orderings are 6, 20 and 70, respectively. In the example of FIG. 8 where k=3, there are 20 possible orders in the possible arrival orders 806 assuming the objects from the individual source tables arrive at the synchronization client software application in the correct order but the arrivals from the two tables are asynchronous.

Figure 9:
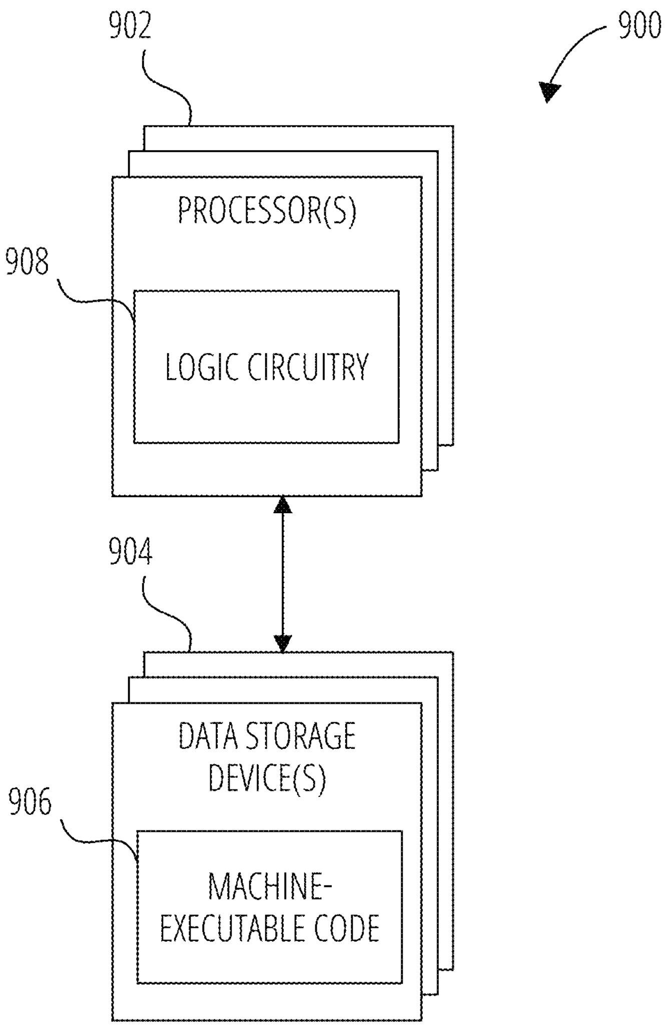
FIG. 9 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 9 illustrates non-limiting examples of implementations of functional elements disclosed herein. In some embodiments, some or all portions of the functional elements disclosed herein may be performed by hardware specially configured for carrying out the functional elements.

FIG. 9 is a block diagram of circuitry 900 that, in some embodiments, may be used to implement various functions, operations, acts, processes, and/or methods disclosed herein. The circuitry 900 includes one or more processors 902 (sometimes referred to herein as "processors 902") operably coupled to one or more data storage devices (sometimes referred to herein as "storage 904"). The storage 904 includes machine-executable code 906 stored thereon and the processors 902 include logic circuitry 908. The machine-executable code 906 includes information describing functional elements that may be implemented by (e.g., performed by) the logic circuitry 908. The logic circuitry 908 is adapted to implement (e.g., perform) the functional elements described by the machine-executable code 906. The circuitry 900, when executing the functional elements described by the machine-executable code 906, should be considered as special purpose hardware configured for carrying out functional elements disclosed herein. In some embodiments, the processors 902 may be configured to perform the functional elements described by the machine-executable code 906 sequentially, concurrently (e.g., on one or more different hardware platforms), or in one or more parallel process streams.

When implemented by logic circuitry 908 of the processors 902, the machine-executable code 906 is configured to adapt the processors 902 to perform operations of embodiments disclosed herein. For example, the machine-executable code 906 may be configured to adapt the processors 902 to perform at least a portion or a totality of the method 200 of FIG. 2 and/or the method 300 of FIG. 3A, FIG. 3B, and FIG. 3C. As another example, the machine-executable code 906 may be configured to adapt the processors 902 to perform at least a portion or a totality of the operations discussed for the change data capture software application 118 of FIG. 1, the data pipeline 120 of FIG. 1, the synchronization client software application 122 of FIG. 1, the example appointment domain 400 of FIG. 4, the example appointment domain 800 of FIG. 8, or combinations thereof. As a specific, non-limiting example, the machine-executable code 906 may be configured to adapt the processors 902 to generate one or more messages comprising objects corresponding to sub-portions of source hierarchical data, the objects including entity identifications, those of the objects corresponding to the one or more sub-levels each further including a parent identification indicating an entity identification of an object in a higher hierarchical level; and change the destination hierarchical data responsive to the objects from the one or more messages within the two or more hierarchical levels.

The processors 902 may include a general-purpose processor, a special-purpose processor, a central processing unit (CPU), a microcontroller, a programmable logic controller (PLC), a digital signal processor (DSP), an application-specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 906 (e.g., software code, firmware code, hardware descriptions) related to embodiments of the present disclosure. It is noted that a general-purpose processor (may also be referred to herein as a host processor or simply a host) may be a microprocessor, but in the alternative, the processors 902 may include any conventional processor, controller, microcontroller, or state machine. The processors 902 may also be implemented as a combination of computing devices, such as a combination of a DSP and a microprocessor, a plurality of microprocessors, one or more microprocessors in conjunction with a DSP core, or any other such configuration.

In some embodiments, the storage 904 includes volatile data storage (e.g., random-access memory (RAM)) and non-volatile data storage (e.g., Flash memory, a hard disc drive, a solid state drive, erasable programmable read-only memory (EPROM), etc.). In some embodiments the processors 902 and the storage 904 may be implemented into a single device (e.g., a semiconductor device product, a system on chip (SOC), etc.). In some embodiments the processors 902 and the storage 904 may be implemented into separate devices.

In some embodiments, the machine-executable code 906 may include computer-readable instructions (e.g., software code, firmware code). By way of non-limiting example, the computer-readable instructions may be stored by the storage 904, accessed directly by the processors 902, and executed by the processors 902 using at least the logic circuitry 908. Also by way of non-limiting example, the computer-readable instructions may be stored on the storage 904, transferred to a memory device (not shown) for execution, and executed by the processors 902 using at least the logic circuitry 908. Accordingly, in some embodiments the logic circuitry 908 includes electrically configurable logic circuitry 908.

In some embodiments, the machine-executable code 906 may describe hardware (e.g., circuitry) to be implemented in the logic circuitry 908 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™, or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments, the machine-executable code 906 may include an HDL, an RTL, a GL description, a mask-level description, other hardware description, or any combination thereof.

In embodiments where the machine-executable code 906 includes a hardware description (at any level of abstraction), a system (not shown, but including the storage 904) may be configured to implement the hardware description described by the machine-executable code 906. By way of non-limiting example, the processors 902 may include a programmable logic device (e.g., an FPGA or a PLC) and the logic circuitry 908 may be electrically controlled to implement circuitry corresponding to the hardware description into the logic circuitry 908. Also by way of non-limiting example, the logic circuitry 908 may include hard-wired logic manufactured by a manufacturing system (not shown, but including the storage 904) according to the hardware description of the machine-executable code 906.

Regardless of whether the machine-executable code 906 includes computer-readable instructions or a hardware description, the logic circuitry 908 is adapted to perform the functional elements described by the machine-executable code 906 when implementing the functional elements of the machine-executable code 906. It is noted that although a hardware description may not directly describe functional elements, a hardware description indirectly describes functional elements that the hardware elements described by the hardware description are capable of performing.

As used in the present disclosure, the terms “module” or “component” may refer to specific hardware implementations configured to perform the actions of the module or component and/or software objects or software routines that may be stored on and/or executed by general-purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general-purpose hardware), specific hardware implementations or a combination of software and specific hardware implementations are also possible and contemplated.

As used in the present disclosure, the term “combination” with reference to a plurality of elements may include a combination of all the elements or any of various different sub-combinations of some of the elements. For example, the phrase “A, B, C, D, or combinations thereof” may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as “open” terms (e.g., the term “including” should be interpreted as “including, but not limited to,” the term “having” should be interpreted as “having at least,” the term “includes” should be interpreted as “includes, but is not limited to,” etc.).

Additionally, if a specific number of an introduced claim recitation is intended, such an intent will be explicitly recited in the claim, and in the absence of such recitation, no such intent is present. For example, as an aid to understanding, the following appended claims may contain usage of the introductory phrases “at least one” and “one or more” to introduce claim recitations. However, the use of such phrases should not be construed to imply that the introduction of a claim recitation by the indefinite articles “a” or “an” limits any particular claim containing such introduced claim recitation to embodiments containing only one such recitation, even when the same claim includes the introductory phrases “one or more” or “at least one” and indefinite articles such as “a” or “an” (e.g., “a” and/or “an” should be interpreted to mean “at least one” or “one or more”); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of “two recitations,” without other modifiers, means at least two recitations, or two or more recitations). Furthermore, in those instances where a convention analogous to “at least one of A, B, and C, etc.” or “one or more of A, B, and C, etc.” is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase “A or B” should be understood to include the possibilities of “A” or “B” or “A and B.”

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A computing system, comprising:

one or more processors; and one or more data storage devices operably coupled to the one or more processors, the one or more data storage devices comprising:

one or more source hierarchical appointment databases stored on the one or more data storage devices, the one or more source hierarchical appointment databases including:

source hierarchical appointment data organized into two or more hierarchical levels including a highest level and one or more sub-levels, items in the highest level corresponding to scheduled appointments and items in the one or more sub-levels corresponding to information relevant to the scheduled appointments of the highest level, a hierarchy for the source hierarchical data defined using parent-child relationships between items in the two or more hierarchical levels;

entity identifications associated with the items to identify the items; and parent identifications associated with those of the items stored in the one or more sub-levels to indicate which of the items are parents to the items;

one or more destination hierarchical appointment databases stored on the one or more data storage devices, the one or more destination hierarchical appointment databases including destination hierarchical appointment data organized into the two or more hierarchical levels; and computer-readable instructions stored on the one or more data storage devices, the computer-readable instructions configured to instruct the one or more processors to:

generate one or more messages comprising objects corresponding to sub-portions of the source hierarchical appointment data, the objects including their respective ones of the entity identifications, those of the objects corresponding to the one or more sub-levels each further including its respective parent identification indicating an entity identification of its parent item in a higher hierarchical level; and change the destination hierarchical data responsive to the objects from the one or more messages within the two or more hierarchical levels.

2. The computing system of claim 1, wherein the computer-readable instructions are further configured to instruct the one or more processors to detect a change to the source hierarchical appointment data and generate the one or more messages responsive to the detected change.

3. The computing system of claim 2, wherein the objects of the one or more messages include changed versions of the sub-portions of the source hierarchical appointment data to update the destination hierarchical appointment data with the changed versions of the sub-portions of the source hierarchical appointment data.

4. The computing system of claim 3, wherein the objects further include created timestamps indicating creation times for the sub-portions of the source hierarchical appointment data.

5. The computing system of claim 3, wherein the objects further include modification timestamps indicating modification times for the sub-portions of the source hierarchical appointment data.

6. The computing system of claim 2, wherein the objects further include data change operations indicating whether the detected change to the source hierarchical appointment data was a creation of new data, an update to existing data, or a deletion of the existing data.

7. The computing system of claim 1, wherein the computer-readable instructions are further configured to instruct the one or more processors to temporarily store those of the objects having parent identifications that do not correspond to existing entity identifications in the destination hierarchical appointment data.

8. The computing system of claim 7, wherein the computer-readable instructions are further configured to instruct the one or more processors to move those of the objects that are temporarily stored to the destination hierarchical appointment database responsive to reception of other objects including entity identifications matching the parent identifications of the temporarily stored objects.

9. The computing system of claim 1, wherein the one or more source hierarchical appointment databases and the one or more destination hierarchical appointment databases are appointment databases for appointments for vehicle dealerships.

10. The computing system of claim 1, wherein the objects include timestamps, the timestamps including one or more of a created timestamp indicating a time at which an object was created or a modification timestamp indicating a time at which an object was modified.

11. The computing system of claim 1, wherein a second highest level of the two or more hierarchical levels corresponds to included services for the scheduled appointments of the highest level.

12. The computing system of claim 1, wherein a third highest level of the two or more hierarchical levels corresponds at least to parts for services of a second-highest level of the two or more hierarchical levels.

13. A method of synchronizing one or more destination hierarchical appointment databases to one or more source hierarchical appointment databases, the method comprising:

detecting a change to source hierarchical appointment data stored by the one or more source hierarchical appointment databases, the source hierarchical appointment data organized into two or more hierarchical levels including a highest level and one or more sub-levels, items in the highest level corresponding to scheduled appointments and items in the one or more sub-levels corresponding to information relevant to the scheduled appointments of the highest level, a hierarchy for the source hierarchical data defined using parent-child relationships between items in the two or more hierarchical levels, entity identifications associated with the items to identify the items and parent identifications associated with those of the items stored in the one or more sub-levels to indicate which of the items are parents to the items;

generating one or more messages, each message including an object, the object corresponding to a segment of the changed source hierarchical appointment data, the object including an entity identification, a change data operation, and one or more timestamps indicating one or more times, the object further including a parent identification if the changed source hierarchical appointment data of the object is from the one or more sub-levels; and changing the destination hierarchical appointment data responsive to the one or more messages.

14. The method of claim 13, wherein:

generating the one or more messages includes generating a message wherein the object of the message includes a create change data operation and a parent identification; and changing the destination hierarchical appointment data responsive to the one or more messages includes storing the segment of the changed source hierarchical data to the destination hierarchical appointment database responsive to determinations that the parent identification is already included as an existing entity identification in the destination hierarchical appointment database and the entity identification of the object is not already included as an existing entity identification in the destination hierarchical appointment database.

15. The method of claim 13, wherein:

generating the one or more messages includes generating a message wherein the object of the message includes a create change data operation and a parent identification; and changing the destination hierarchical appointment data responsive to the one or more messages includes marking the object as pending responsive to determinations that the parent identification is not yet included as an existing entity identification in the destination hierarchical appointment database.

16. The method of claim 13, wherein:

generating the one or more messages includes generating a message wherein the object of the message includes a create change data operation but the object does not include a parent identification; and changing the destination hierarchical appointment data responsive to the one or more messages includes storing the segment of the changed source hierarchical appointment data to the destination hierarchical appointment database responsive to a determination that the entity identification of the object is not already included as an existing entity identification in the destination hierarchical appointment database.

17. The method of claim 13, wherein:

generating the one or more messages includes generating a message wherein the object of the message includes a create change data operation; and changing the destination hierarchical appointment data responsive to the one or more messages includes stopping processing of the object responsive to a determination that the entity identification of the object is already included as an existing entity identification in the destination hierarchical appointment database.

18. The method of claim 13, wherein:

generating the one or more messages includes generating a message wherein the object of the message includes an update change data operation; and changing the destination hierarchical appointment data responsive to the one or more messages includes processing the object as a create change data operation responsive to a determination that the entity identification of the object is not already included as an existing entity identification in the destination hierarchical appointment database.

19. The method of claim 13, wherein:

generating the one or more messages includes generating a message wherein the object of the message includes an update change data operation; and changing the destination hierarchical appointment data responsive to the one or more messages includes updating the destination hierarchical appointment data with the segment of the changed source hierarchical appointment data corresponding to the object responsive to determinations that the update is not trivial, a corresponding update timestamp is present in the destination hierarchical appointment database, and the corresponding update timestamp is earlier than an update timestamp of the message.

20. The method of claim 13, wherein:

generating the one or more messages includes generating a message wherein the object of the message includes a delete change data operation; and changing the destination hierarchical appointment data responsive to the one or more messages includes deleting a segment of the destination hierarchical appointment data that corresponds to the segment of changed source hierarchical appointment data responsive to determinations that the entity identification of the object already exists as an existing entity identification in the destination hierarchical appointment database and a modification timestamp of the object is earlier than an existing modification timestamp of the segment of the destination hierarchical appointment data.

* * * * *